US012235341B2

(12) United States Patent
Jadidian et al.

(10) Patent No.: US 12,235,341 B2
(45) Date of Patent: Feb. 25, 2025

(54) RADAR TRACKING WITH GREATER THAN RANGE RESOLUTION PRECISION

(71) Applicant: Microsoft Technology Licensing, LLC, Redmond, WA (US)

(72) Inventors: Jouya Jadidian, Los Gatos, CA (US); Seyedsohrab Madani, Watertown, MA (US); Mohammad Malik, Snoqualmie, WA (US); Muddassar Aslam, Mountain View, CA (US); Alfonsus Lunardhi, San Ramon, CA (US); Scott Fullam, Palo Alto, CA (US); Rubén Caballero, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 592 days.

(21) Appl. No.: 17/543,727

(22) Filed: Dec. 6, 2021

(65) Prior Publication Data

US 2023/0176203 A1 Jun. 8, 2023

(51) Int. Cl.
*G01S 13/42* (2006.01)
*G01S 13/58* (2006.01)
*G01S 13/66* (2006.01)

(52) U.S. Cl.
CPC ............ *G01S 13/42* (2013.01); *G01S 13/66* (2013.01); *G01S 13/584* (2013.01)

(58) Field of Classification Search
CPC ......... G01S 13/42; G01S 13/66; G01S 13/584
(Continued)

(56) References Cited

U.S. PATENT DOCUMENTS 4,901,083 A * 2/1990 May .................. G01S 13/931
342/128
5,012,206 A * 4/1991 Tigges .............. H03K 17/954
331/65

(Continued)

FOREIGN PATENT DOCUMENTS

EP 0998659 A1 5/2000
EP 2261701 A2 * 12/2010 ........... B29C 43/021

(Continued)

OTHER PUBLICATIONS

Shang Hui et al. ("Random Body Movement Cancellation Method for FMCW Radar Vital Sign Detection", 2019 IEE International conference on signal, information and data processing (ICSIDP), IEEE, Dec. 11, 2019, pp. 1-4, XP033813557, DOI: 10.1109/ICSIDP47821.2019.9173434) (Year: 2019).*

(Continued)

*Primary Examiner* — Nuzhat Pervin
(74) *Attorney, Agent, or Firm* — Alleman Hall & Tuttle LLP

(57) ABSTRACT

To track an object with radar, and achieve greater than range resolution precision, the phase of a difference signal can be utilized and adjusted as the tracked object crosses between resolution ranges. Changes in the object's distance can be detected with greater than range resolution precision by utilizing the phase. Such changes can iteratively inform the determined distance across multiple phase cycles within a single distance range. As the movement of the object approaches, and then crosses, between resolution ranges, the phase as determined within an origin resolution range can be compared with a coincident phase within the destination resolution range and the difference can then be utilized to adjust the phase as the object then remains within the destination resolution range. Such phase adjustments can be applied across multiple resolution ranges, allowing for the (Continued)

tracking of an object, utilizing radar, while achieving greater than range resolution precision.

20 Claims, 9 Drawing Sheets

(58) Field of Classification Search
USPC .......................................................... 342/22
See application file for complete search history.

(56) References Cited

U.S. PATENT DOCUMENTS

| | | | | |
|---|---|---|---|---|
| 6,078,281 | A * | 6/2000 | Milkovich | G06F 17/14 |
| | | | | 342/162 |
| 6,865,477 | B2 * | 3/2005 | Nicosia | G01S 13/953 |
| | | | | 701/500 |
| 7,333,047 | B2 * | 2/2008 | Fullerton | G01S 13/72 |
| | | | | 342/28 |
| 9,678,197 | B2 * | 6/2017 | Vacanti | G01S 13/882 |
| 9,791,550 | B2 * | 10/2017 | Mckitterick | G01S 7/35 |
| 9,939,522 | B2 * | 4/2018 | Hong | G01S 13/42 |
| 9,971,020 | B1 * | 5/2018 | Maher | G11C 11/409 |
| 10,012,726 | B2 * | 7/2018 | Schoor | G01S 7/35 |
| 10,036,805 | B2 * | 7/2018 | Lee | G01S 13/32 |
| 10,054,670 | B2 * | 8/2018 | Phillips | G01S 7/2921 |
| 10,578,747 | B2 * | 3/2020 | Grgich | G01S 19/39 |
| 10,656,257 | B2 * | 5/2020 | Lee | G01S 13/04 |
| 10,718,860 | B2 * | 7/2020 | Santra | H03L 7/0805 |
| 11,340,331 | B2 * | 5/2022 | Maher | G01S 7/032 |
| 11,500,106 | B2 * | 11/2022 | Crouch | G01S 17/89 |
| 11,719,819 | B2 * | 8/2023 | Sebastian | G01C 3/08 |
| | | | | 356/28 |
| 2002/0147544 | A1 * | 10/2002 | Nicosia | F21S 4/10 |
| | | | | 701/16 |
| 2003/0222778 | A1 * | 12/2003 | Piesinger | G01S 15/003 |
| | | | | 340/541 |
| 2006/0216306 | A1 * | 9/2006 | Walker | C07K 14/005 |
| | | | | 424/188.1 |
| 2006/0238411 | A1 * | 10/2006 | Fullerton | G01S 13/72 |
| | | | | 342/147 |
| 2009/0219039 | A1 * | 9/2009 | Fasshauer | H03K 17/955 |
| | | | | 324/683 |
| 2014/0320335 | A1 * | 10/2014 | Lee | G01S 13/878 |
| | | | | 342/107 |
| 2016/0146933 | A1 * | 5/2016 | Rao | G01S 13/583 |
| | | | | 342/132 |
| 2018/0011181 | A1 * | 1/2018 | Urakawa | G01S 13/343 |
| 2018/0128910 | A1 * | 5/2018 | Lee | G01S 13/426 |
| 2019/0049958 | A1 * | 2/2019 | Liu | G01S 17/00 |
| 2019/0212822 | A1 * | 7/2019 | Keller | G06F 3/0426 |
| 2020/0011996 | A1 * | 1/2020 | Sebastian | G01B 9/02004 |
| 2020/0064467 | A1 * | 2/2020 | Wang | G05D 1/102 |
| 2020/0081110 | A1 * | 3/2020 | Nam | G01S 13/42 |
| 2020/0124712 | A1 * | 4/2020 | Christoffers | G01S 7/2813 |
| 2020/0132850 | A1 * | 4/2020 | Crouch | G01S 17/894 |
| 2020/0150260 | A1 * | 5/2020 | Lang | G01S 13/42 |
| 2020/0284874 | A1 * | 9/2020 | Narayana Moorthy | |
| | | | | G01S 13/343 |
| 2020/0341131 | A1 * | 10/2020 | You | G01S 7/352 |
| 2021/0181329 | A1 * | 6/2021 | Kashiwagi | G01S 13/343 |
| 2021/0255280 | A1 * | 8/2021 | Santra | G01S 13/88 |
| 2021/0278544 | A1 * | 9/2021 | Crouch | G01S 17/931 |
| 2021/0373124 | A1 * | 12/2021 | Murakami | G01S 7/411 |
| 2022/0206109 | A1 * | 6/2022 | Ikram | G01S 13/34 |
| 2022/0317285 | A1 * | 10/2022 | Wang | G01S 13/931 |
| 2022/0404482 | A1 * | 12/2022 | Stapelbroek | G01S 7/356 |
| 2023/0025474 | A1 * | 1/2023 | Baker | G01S 17/34 |
| 2023/0051791 | A1 * | 2/2023 | Sturm | G01S 13/931 |
| 2023/0066386 | A1 * | 3/2023 | Kim | G01S 13/42 |
| 2023/0094118 | A1 * | 3/2023 | Subburaj | G01S 13/931 |
| | | | | 342/107 |
| 2024/0134034 | A1 * | 4/2024 | Rao | G01S 7/352 |

FOREIGN PATENT DOCUMENTS

| | | | | |
|---|---|---|---|---|
| EP | | 3712809 A1 * | 9/2020 | G01S 13/46 |
| WO | WO-2019209727 A1 * | | 10/2019 | B60W 40/02 |

OTHER PUBLICATIONS

ShangHuietal.(RandomBodyMovementCancellationMethodforFMCWRadarVitalSignDetection,2019IEEInternational conferenceonsignal,informationanddataprocessing(ICSIDP), IEEE, Dec. 11, 2019,pp. 1-4,XP033813557,DOI: 10.1109/ICSIDP47821.2019.9173434)(Year:2019) (Year: 2019).*
"International Search Report and Written Opinion Issued in PCT Application No. PCT/US22/028879", Mailed Date: Aug. 9, 2022, 14 Pages.
"International Search Report and Written Opinion Issued in PCT Application No. PCT/US22/043730", Mailed Date: Dec. 19, 2022, 18 Pages.
Shang, et al., "Random Body Movement Cancellation Method for FMCW Radar Vital Sign Detection", In Proceedings of IEEE International Conference on Signal, Information and Data Processing, Dec. 11, 2019, 4 Pages.

* cited by examiner

RADAR TRACKING WITH GREATER THAN RANGE RESOLUTION PRECISION

BACKGROUND

Since World War II, radar has been utilized to detect remote objects. Radar relies on the transmission of a radio wave signal and the subsequent receipt of a bounce-back of the transmitted radio wave signal that is reflected, or "bounced" off of, the remote object. One type of radar that is utilized to determine the distance of an object, specifically how far away the object is from the radar transmitter and receiver, is a Frequency-Modulated Continuous-Wave ("FMCW") radar. An FMCW radar operates by transmitting "chirps" that are short duration signals during which the frequency of the signal increases with time, such that the signal starts at a lower frequency and ends at a higher frequency. The resulting signal that is reflected from a remote object is then compared with the originally transmitted chirp. The received signal is the same as the transmitted signal, except that it is delayed by an amount equal to the round-trip time of the signal to-and-from the remote object. Because of the nature of the increasing frequency chirp, this difference is a constant frequency, with the frequency determined by the round-trip time and, thus, by the distance between the object and the radar.

The range resolution of the radar, namely the ability of the radar to determine a distance of a remote object to within a given range, is dependent upon the ability to differentiate between different frequencies when the reflected signal is compared with the originally transmitted signal. For example, an FMCW radar having a 4 GHz bandwidth can have a range resolution of slightly less than four centimeters. As a consequence, a determined distance of a remote object, utilizing such a radar, may have an error of up to four centimeters. Similarly, an object may change its distance by up to four centimeters before any change is detected by such a radar. For many applications such range resolution can be far too imprecise for practical applicability.

Within a given range, small movements of an object can be detected by referencing the phase difference, and not just the frequency difference, between the transmitted chirp and the received signal, which, as indicated, is the chirp as reflected by the remote object. For example, the vibrations of a machine, or other like small movements, can be detected by observing the phase difference. However, if such movements exceed range thresholds, such that the difference between the transmitted chirp and received bounce-back changes frequency, then the phase difference can no longer be used. In other words, phase differences are only applicable for detecting changes in object distance within a narrow distance range.

SUMMARY

To track an object with radar, and achieve greater than range resolution precision, the phase of a difference signal can be utilized and adjusted as the tracked object crosses between resolution ranges. Once an initial distance of the object is determined, subsequent changes in the object's distance can be detected with greater than range resolution precision by utilizing the phase of the difference signal. Such changes can iteratively inform the determined distance across multiple phase cycles within a single distance range. As the movement of the object approaches, and then crosses, between resolution ranges, the phase as determined within an origin resolution range can be compared with a coincident phase within the destination resolution range and the difference can then be utilized to adjust the phase as the object then remains within the destination resolution range. Such phase adjustments can be applied across multiple resolution ranges, allowing for the tracking of an object, utilizing radar, while achieving greater than range resolution precision. To aid in the determination of a location of an object within three-dimensional space, trilateration can be performed, utilizing multiple radars. As part of the trilateration, discrepancies between the multiple radars can be addressed, including by disregarding the determined distance by one or more of the multiple radars. To address potential initial distance errors, an alternative system can be utilized to determine an exact distance, which can be provided as an input, and the phase-based distance determination mechanisms can then be utilized to track the distance of the object as it changes from such an initial distance.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
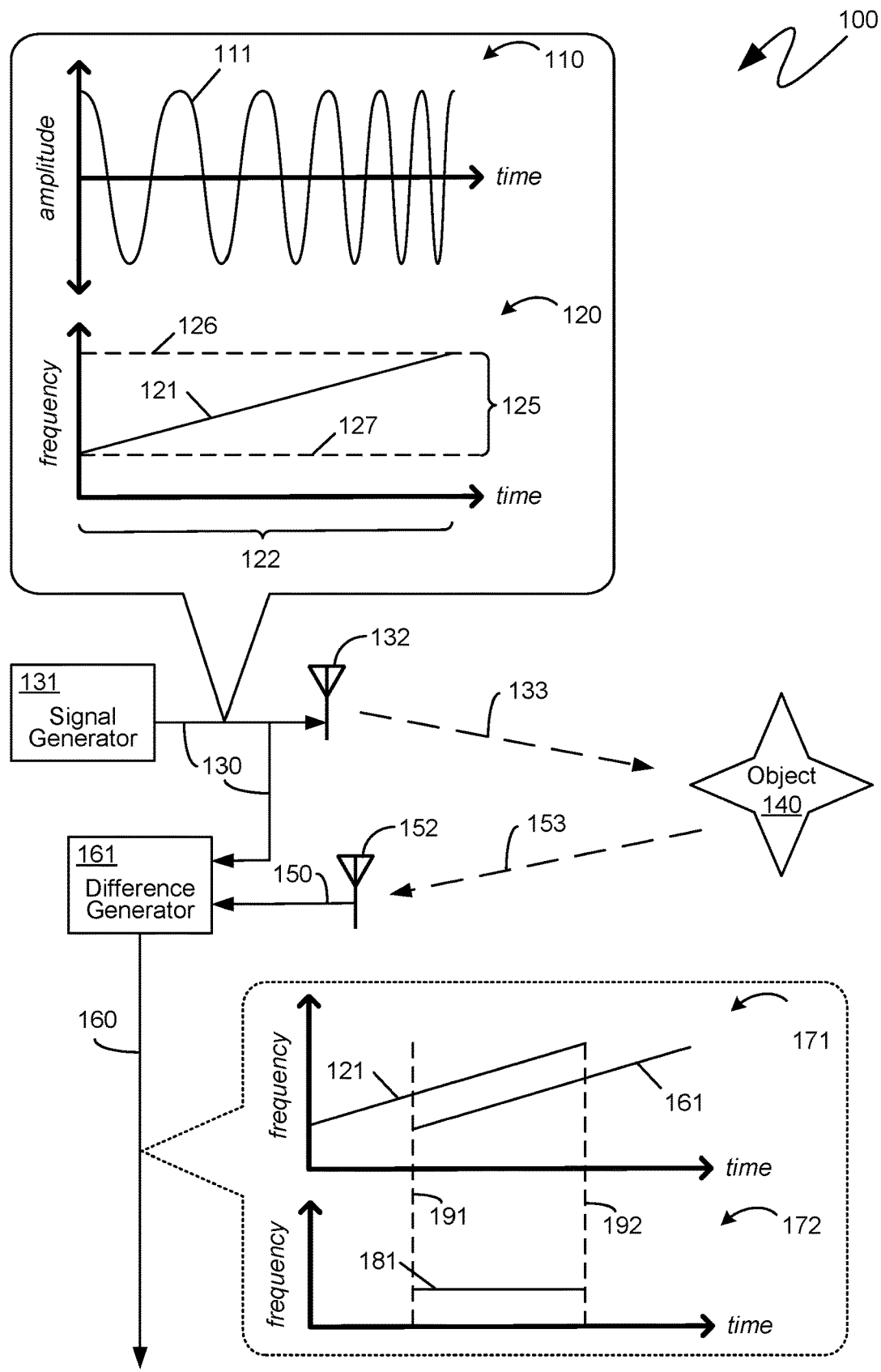
FIG. 1 is a system diagram of an example of using radar to detect the distance of a remote object.

The following description relates to the tracking of objects utilizing radar. To track an object with radar, and achieve greater than range resolution precision, the phase of a difference signal can be utilized and adjusted as the tracked object crosses between resolution ranges. Once an initial distance of the object is determined, subsequent changes in the object's distance can be detected with greater than range resolution precision by utilizing the phase of the difference signal. Such changes can iteratively inform the determined distance across multiple phase cycles within a single distance range. As the movement of the object approaches, and then crosses, between resolution ranges, the phase as determined within an origin resolution range can be compared with a coincident phase within the destination resolution range and the difference can then be utilized to adjust the phase as the object then remains within the destination resolution range. Such phase adjustments can be applied across multiple resolution ranges, allowing for the tracking of an object, utilizing radar, while achieving greater than range resolution precision. To aid in the determination of a location of an object within three-dimensional space, trilateration can be performed, utilizing multiple radars. As part of the trilateration, discrepancies between the multiple radars can be addressed, including by disregarding the determined distance by one or more of the multiple radars. To address potential initial distance errors, an alternative system can be utilized to determine an exact distance, which can be provided as an input, and the phase-based distance determination mechanisms can then be utilized to track the distance of the object as it changes from such an initial distance.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. In the exemplary system 100, a radar is represented by the transmitting antenna 132 and receiving antenna 152. While illustrated as separate antennas, the transmitting antenna 132 and receiving antenna 152 are often the same physical antenna, with the single physical antenna acting as a transmitting antenna 132 for a period of time, and then, once the transmission of the signal is complete, acting as a receiving antenna 152. Indeed, the duration of the transmission of a signal is often selected so that the single antenna is no longer transmitting, and can be receiving a bounce back signal, by the time that such a bounce back signal would be expected.

Referencing the transmission, and subsequent reception, of signals, exemplary system 100 shown in FIG. 1 illustrates a signal 133 being transmitted from the transmitting antenna 132. The signal 133, upon encountering an object, such as the exemplary object 140, can be reflected by the object 140, including being reflected back in the direction of the transmitting antenna 132, which can now be acting as the receiving antenna 152. The receipt of such a bounce back signal 153, by the receiving antenna 152, is illustrated in FIG. 1.

The transmitted signal 133 can take various forms. According to one aspect, in a Frequency-Modulated Continuous-Wave ("FMCW") radar, the transmitted signal is known as a "chirp" and is a signal of a fixed duration whose frequency increases, typically linearly. The exemplary graph 110 illustrates a chirp on an amplitude/time graph, with the graphed signal 111 starting with a lower frequency oscillation, and then increasing the frequency of its oscillations as time progresses. As can be seen from the exemplary graph 110, the chirp can be of a fixed duration, illustrated as the length of time 122. Correspondingly, the exemplary graph 120 illustrates the same chirp on a frequency/time graph, where the graphed signal 121 is shown as commencing with an initial, lower frequency, illustrated as the frequency 127, and then progressing linearly upward throughout the duration 122, terminating at an ending, higher frequency, illustrated as the frequency 126. As utilized herein, the term "chirp" means a transmitted radio signal having a fixed duration whose frequency increases throughout the fixed duration from an initial frequency to an ending frequency.

According to one aspect, to detect a distance between the object 140 and the radar, a difference signal, such as the exemplary difference signal 160, can be analyzed. More specifically, and as illustrated by the exemplary system 100 of FIG. 1, a radar can comprise, in addition to one or more antennas, a signal generator, such as the exemplary signal generator 131, which can initially generate signals for transmission by the antenna(s), including the exemplary chirp 130, whose properties were illustrated by the graphs 110 and 120. In addition to providing the chirp 132 and antenna for transmission, such as the exemplary transmitting antenna 132, the signal generator 131 can additionally provide the chirp 130 to a difference generator, such as the exemplary difference generator 161. The difference generator 161 can generate a difference signal, such as the exemplary difference signal 160, that can be the difference between the transmitted signal 133 and the received bounce back signal 153. As utilized herein, the term "difference signal" means the difference between two signals, specifically the transmitted and received signals, with such a difference itself being in the form of a signal. Accordingly, the phrase "difference between the transmitted and received signals" is meant to be synonymous with the term "difference signal". Returning to the difference generator 161, the difference generator 161 can generate an analog difference between the two signals it receives as input, such as the chirp 130 and the signal 150, through the utilization of one or more op amps, or other like discrete or integrated circuitry. Alternatively, the chirp 130 and the signal 150 can be digitized prior to being provided to the difference generator 161, and the difference generator 161 can be a digital signal processing device that generates a digital difference signal 160.

In addition to having the chirp 130 provided as input, the difference generator 161 can also have the received signal 153, in the form of the signal 150, also provided as input, and can generate a difference between them. As will be recognized, the received signal 153 is a reflected version of the transmitted signal 133. As such, the signal 150 is a time delayed version of the chirp 130, with the amount of time delay being based on the round-trip signal propagation time from the radar to the object 140 and then back again. The exemplary graph 171 is a frequency/time graph and illustrates the graphed signal 121 of the chirp 130, as originally shown in the graph 120, as well as a time delayed version of the chirp 130 in the form of the bounce back signal 153, which is shown as the graphed signal 161. The exemplary graph 172 then shows the graphed difference signal 181 between the two signals, which, as illustrated, is a constant frequency signal which starts at a first time 191 and ends at a second time 192, with the duration of the graphed difference signal 181 being the difference between the start time 191 and the end time 192. More specifically, the rate of increase of the frequency of the received signal 150 is the same as that of the chirp 130 such that the difference between them is constant and only dependent on how delayed the received signal 150 is from the chirp 130.

To facilitate analysis of the difference signal, it is typically transformed into the frequency domain, such as by performing a Fourier transform. On a computing device, the difference signal can first be digitized in order to be input into the computer in digital form, if it was not already generated in digital form by the difference generator 161, and then subsequently a Fourier transform, such as a digital fast Fourier transform, can be performed. Accordingly, and as will be detailed below, the sampling rate utilized in the digitization process, as well as the Fourier transform itself, can limit the ability to distinguish between short duration signals of slightly different frequencies.

Figure 2:
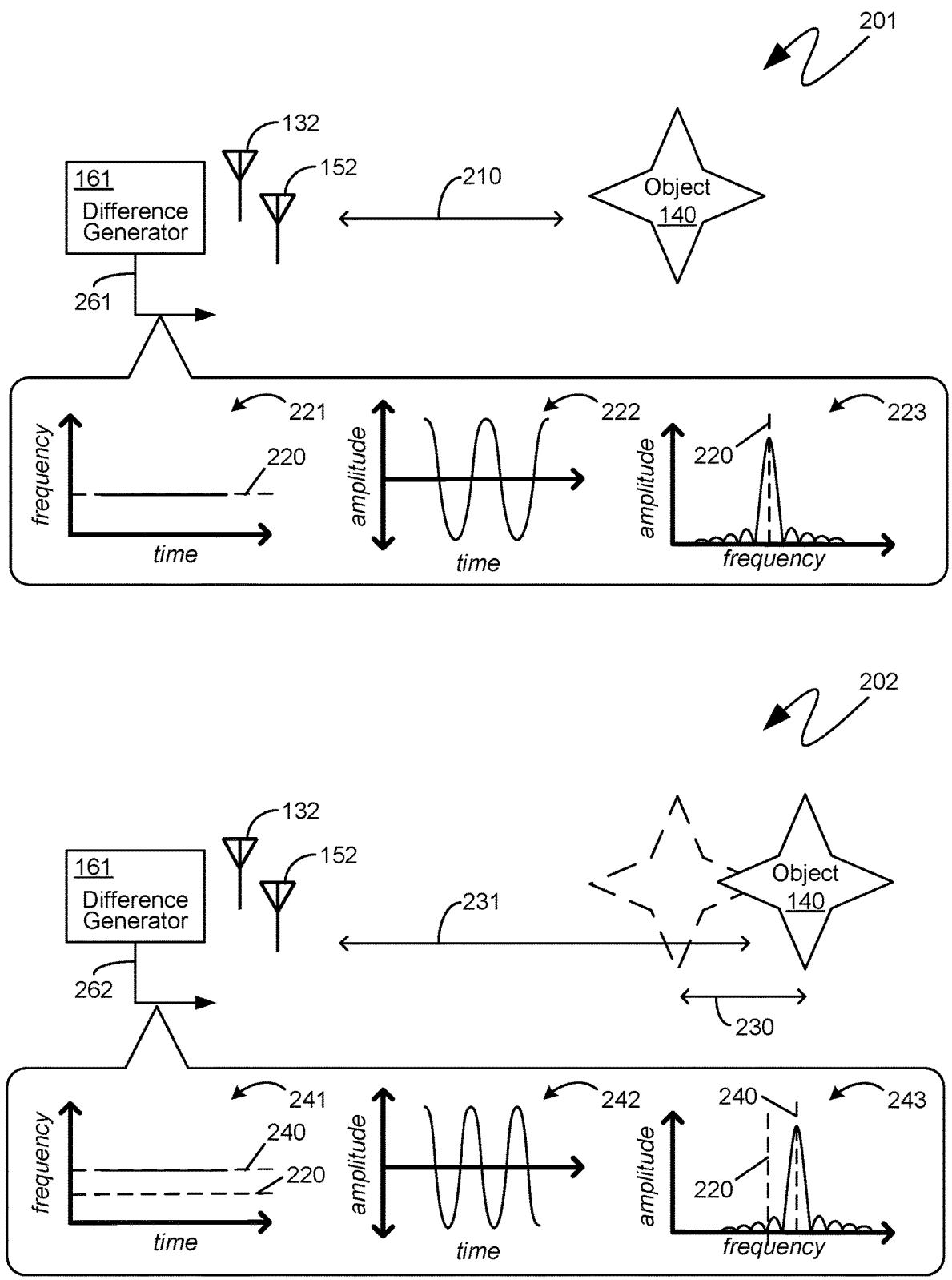
FIG. 2 is a system diagram of an example of using radar to detect large changes in the distance of an object.

Turning to FIG. 2, the exemplary system 201 shown therein illustrates the object 140 at a distance 210 from the radar, as represented by the antennas 132 and 152, described previously. The resulting difference signal 261, generated in the manner detailed above, is a constant frequency signal of a predetermined duration. The exemplary frequency/time graph 221 illustrates the difference signal as having a frequency 220. The exemplary amplitude/time graph 222 illustrates the difference signal as a constant frequency waveform having a limited duration. Lastly, the exemplary amplitude/frequency graph 223 illustrates the signal in the frequency domain, such as after a Fourier transform was performed. As can be seen, in the frequency domain, as shown in the amplitude/frequency graph 223, there is a peak at the frequency 220. As utilized herein, the term "peak", within the context of a frequency domain representation of a signal, means an amplitude that is greater than other amplitudes such that, when graphed in an amplitude/frequency graph, the greater amplitude is illustrated as a visual peak within the graph.

The peak in the frequency domain identifies the dominant frequency and, as such, the round-trip time because the frequency of the difference signal is based on how delayed the bounce-back signal is from the original chirp, as detailed above. Consequently, because that delay is based on the distance 210, and the known speed of propagation of the signal, the frequency 220 can be utilized to determine the distance 210 between the object 140 and the radar.

Turning to the system 202, the object 140 is shown as having moved a distance 230 further from the radar, such that the total distance 231 between the radar and the object after the object's move is greater than the original distance 210. As a consequence, the delay between the transmission of a chirp, and the receipt of a bounce back signal, reflecting the chirp, from the object 140, can be greater due to the increased round trip time necessitated by the increased distance 231. Such a delay results in the difference signal 262, generated by the difference generator 161, having a higher frequency. Thus, as illustrated in the exemplary frequency/time graph 241, the difference signal 262 can have a higher frequency 240 than the frequency 220 of the difference signal 261 shown in the system 201. The exemplary amplitude/time graph 242 illustrates such a higher frequency difference signal as a waveform. Similarly, the exemplary amplitude/frequency graph 243 illustrates a frequency domain representation of the difference signal 262, such as after the performance of a Fourier transform. As can be seen, the frequency domain representation of the difference signal 262, in the amplitude/frequency graph 243, illustrates a peak at the frequency 240, which is different than the frequency 220 at which the frequency domain representation of the difference signal 261 generated a peak.

As indicated previously, the same antenna is often utilized for both transmission and reception. To allow the antenna to receive, transmission of the chirp must terminate, and, accordingly, chirps are of a limited duration. The resulting difference signal is then also of a limited duration, as shown above. Within the context of Fourier transforms, and taking into account the sampling rate of the digitization of the difference signal, there may be an insufficient quantity of cycles within duration of a difference signal to distinguish between two frequencies that are close together. In other words, for two difference signals that are of two different constant frequencies, if the difference between the frequencies is small enough, the resulting frequency domain representation will show no difference between them due to the short duration of the signals. In practical terms, this means that the distance of an object determined by an FMCW radar is imprecise.

Figure 3:
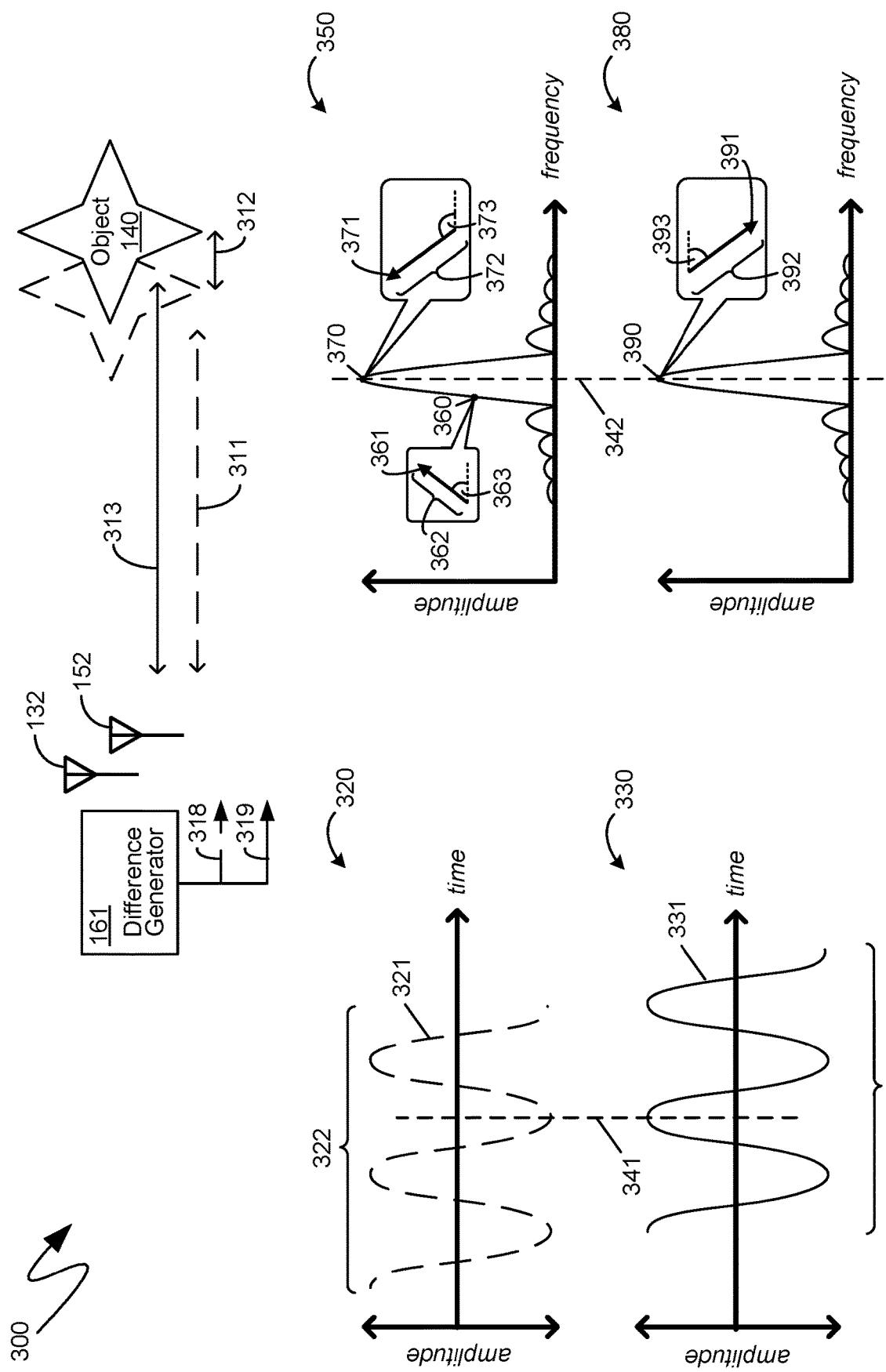
FIG. 3 is a system diagram of an example of using radar to detect small changes in the distance of an object.

Turning to FIG. 3, the exemplary system 300 illustrates how small changes in the distance of an object 140 may not be detected by reference to the frequency of the difference signal. More specifically, the exemplary system 300 illustrates an object 140 that is an initial distance 311 from a radar. As before, the radar can be a FMCW radar and can generate chirps that bounce off of the object 140 and are then detected by the radar. The difference between the transmitted chirp and the received bounce back signal can then be generated by the difference generator 161, such as the manner detailed above. Within the exemplary system 300 of FIG. 3, the object 140 is shown as moving a small distance 312 further away from the radar, such that the total distance to the object 140 from the radar increases from the distance 311 to the distance 313. Consequently, the difference generator 161 first generates a difference signal 318, when the object is a distance 311 away from the radar, and then subsequently generates a difference signal 319 when the object is a further distance 313 away from the radar.

The exemplary amplitude/time graph 320 illustrates the difference signal 318 as the waveform 321, while the exemplary amplitude/time graph 330 illustrates the difference signal 319 as the waveform 331. Correspondingly, the exemplary amplitude/frequency graph 350 illustrates the difference signal 318 in the frequency domain, while the exemplary amplitude/frequency graph 380 illustrates the difference signal 319 in the frequency domain. As indicated previously, both the difference signal 318 and the difference signal 319 can be of a limited duration. For example, as illustrated from the waveform 321, the difference signal 318 can have a duration 322, while, as illustrated by the way form 331, the difference signal 319 to have a duration 332. The difference signals 318 and 319 can have slightly different frequencies due to the slightly different distances of the object 140, namely the distances 311 and 313, respectively. However, the durations 322 and 332 may limit the quantity of cycles of the difference signals 318 and 319 within such durations. As a result, due to the insufficient quantity of cycles, the Fourier transform may not sufficient information to distinguish between the two different frequencies of the difference signals 318 and 319. Accordingly, the exemplary amplitude/frequency graph 350, of the difference signal 318, shows a peak 370 at a frequency 342, which is the same frequency at which the amplitude/frequency graph 380, of the difference signal 319, shows a peak 390. Simply put, when analyzed within the frequency domain, the difference signals 318 and 319 appear to have the same frequency 342. As a result, a determination of the distance of the object 140 based on such difference signals will not show any difference in the distance of the object, even though the distance changed from the distance 311 to the distance 313.

The imprecision of the distance determination is sometimes addressed by reference to "range bins", or other like terminology that is indicative of a range of distances that will result in the same frequency domain representations given the aforedescribed limitations of digital Fourier transforms, and the corresponding analysis therefrom. For example, a FMCW radar operating at a bandwidth of 4 GHz can have a range resolution of approximately 4 cm. As such, movements of an object within a four centimeter range cannot be detected by such a radar. More specifically, there will be a specific range of distances, such as between 53 cm and 57 cm away from the radar, and any object within that range will appear to be the same distance away from the radar because the difference signal from any object within that range will result in a same frequency, as determined utilizing the above described mechanisms. A second specific range of distances, such as between 57 cm and 61 cm, can then also exist such that any object within that range will appear to be the same distance away from the radar for the same reasons. However, an object moving between, for example, 56.5 cm and 57.5 cm will be detected as having moved because the difference in distances transitions across two different ranges of distances.

Figure 4:
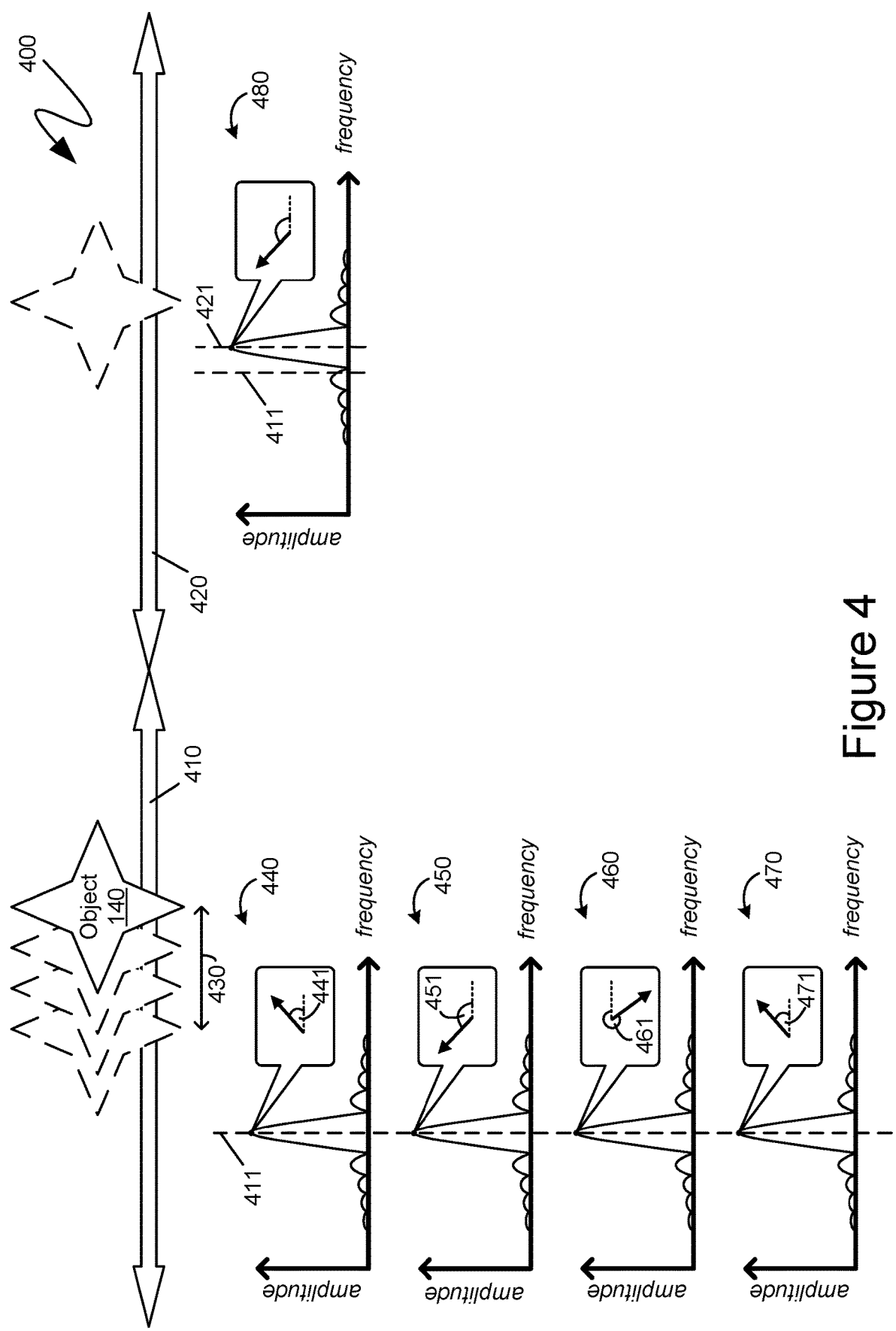
FIG. 4 is a system diagram of another example of using radar to detect to detect small changes in the distance of an object.

As utilized herein, the term "range resolution" means the size of the range of distances within which an object generates a same frequency difference signal within the context of the radar specifications and corresponding analysis of the radar signals. For example, the "range resolution" of a FMCW radar operating at a bandwidth of 4 GHz is approximately 4 cm. By contrast the term "resolution range" means a specific range of distances, delineated by a specific starting distance and a specific ending distance, within which an object generates a same frequency difference signal within the context of the radar specifications and corresponding analysis of the radar signals. Thus, for example, while the "range resolution" of a FMCW radar operating at a bandwidth of 4 GHz is approximately 4 cm, one specific "resolution range" of such an FMCW radar can be, for example, between 53 cm and 57 cm away from the radar, while another specific "resolution range" of such an FMCW radar can be, for example, between 57 cm and 61 cm away from the radar. As utilized herein, the term "range bin" is meant to be synonymous with the term "resolution range". Accordingly, as utilized herein the term "range change" means a change from one "range bin" to another. Turning briefly to FIG. 4, the exemplary system 400 shown therein illustrates two "range bins" or "resolution ranges" in the form of the range bins 410 and 420. Movement of the object 140 from the range bin 410 to the range bin 420 is a "range change" as that term has been defined herein.

Turning back to FIG. 3, one mechanism by which radar, such as an FMCW radar, can be utilized to detect more accurate distance changes is to utilize phase information. More specifically, as shown in the system 300 of FIG. 3, because of the additional distance 313, as compared with the original distance 311, of the object 140, a bounce back signal from the object 140 at the distance 313 can take longer to return to the radar than a bounce back signal from the object 140 at the distance 311. Correspondingly, as shown within the amplitude/time graphs 320 and 330, the waveform 321, of the difference signal 318, commences earlier than the waveform 331, of the difference signal 319. As a result of this increased delay, the waveform 331 is out of phase with the waveform 321. For example, selecting an instant in time, such as the exemplary instant in time 341, it can be seen that, at the instant in time 341, the waveform 321 has reached a trough, and is increasing, while the waveform 331 has reached a nadir, and is decreasing.

Such a difference in phase is also reflected within the frequency domain representation. More specifically, the result of a Fourier transform on a waveform is a sequence of phasors corresponding to different frequencies, with each phasor having an amplitude and a phase. For example, the point 360, in the frequency domain representation shown in the amplitude/frequency graph 350, has both an amplitude, that is visually illustrated in the graph, and a phase. More specifically, the information being output by the Fourier transform for the frequency corresponding to the point 360 is in the form of a phasor, such as the exemplary phasor 361, having both an amplitude 362 and a phase 363.

Referencing the phasors of the peaks 370 and 390, both corresponding to the frequency 342, the peak 370 can be correlated with a phasor 371, as output by the Fourier transform, with the phasor 371 having an amplitude 372 and a phase 373, while, similarly, the peak 390 can be correlated with a phasor 391, as output by the Fourier transform, with the phasor 391 having an amplitude 392 and a phase 393. While both of the phasors 371 and 391 correspond to the same frequency 342, they do not have the same phase. For example, as illustrated, the phase 373 of the phasor 371 differs from the phase 393 of the phasor 391. Such differences in phase can be utilized to more precisely detect the movements of an object within a single range bin.

Turning to FIG. 4, the exemplary system 400 shown therein illustrates the tracking of changes in the distance of an object 140 from the radar with greater than the range resolution precision, so long as the object only moves within a single resolution range, or range bin. For example, the object 140 is illustrated as consecutively moving across an aggregate change in distance 430, with the aggregate change in distance 430 being significantly smaller than the range bin 410. The object's moves across the aggregate change in distance 430 can be tracked via a sequence of chirps and corresponding bounce back signals, the differences of which can be generated, such as in the manner detailed above. The resulting frequency domain representations of such difference signals and then illustrated in FIG. 4 by the exemplary amplitude/frequency graphs 440, 450, 460 and 470. As can be seen, each of the difference signals from each of the positions of the object 410 as it moves through the aggregate change in distance 430 can result in frequency domain peaks at a frequency 411. In other words, with reference to the frequency of the corresponding difference signals, the object 140 is not detected to have moved. Such a finding corresponds with the object 140 remaining within a single range bin, such as the exemplary range bin 410, for the reasons detailed above. However, the phase of the phasor of the peaks does show changes, changing from the phase 441 shown in the graph 440, to the phase 451 shown in the graph 450, to the phase 461 shown in the graph 460, and lastly to the phase 471 shown in the graph 470.

The phase can be any value between zero and two pi radians, or between zero and three-hundred and sixty degrees. As can be seen from the exemplary system 400 of FIG. 4, the phase can move through a complete cycle across a change in distance 430 that is smaller, indeed sometimes substantially smaller, than the distance encompassed within a single range bin. For example, the phase can move through multiple complete cycles of zero to two pi radians, or zero to three-hundred and sixty degrees, across a change in distance that is equivalent to a single range bin. Accordingly, the mere determination of phase, without more, cannot inform a precise distance of the object 140 from the radar. As such, phase has only been utilized to monitor the vibrations of objects within a very small range of distances, such as objects that move only a couple of millimeters in either direction around a central distance. In particular, the phase has only been utilized to monitor the vibrations of objects within a range of distances that is less than a single cycle of the phase from zero to two pi radians, or zero to three-hundred and sixty degrees.

However, once an initial distance of the object is determined within a single range bin, such as the exemplary range bin 410, the phase can be utilized to track the movements of the object across the range bin, taking into account the cycles of the phase. As utilized herein the term "phase cycle" means one cycle from zero to two pi radians, or from zero to three-hundred and sixty degrees, in the phase of the phasor having a largest amplitude in a Fourier transform, and the corresponding changes in the distance of a remote object where the difference between a transmitted chirp and the bounce back of that transmitted chirp off of the object is the difference signal to which the Fourier transform is applied. For example, while the "range resolution" of a FMCW radar operating at a bandwidth of 4 GHz is approximately 4 cm, the "phase cycle" is only a few millimeters in that movement of the object across a range of a few millimeters will result in the above-described phase cycling from zero all the way to two pi radians (or three-hundred and sixty degrees).

As indicated, once an initial distance of the object is determined with accuracy within a single range bin, such as the exemplary range bin 410, the phase can be utilized to track the movements of the object across the range bin. For example, if the phase of the phasor having a largest amplitude in a Fourier transform of the difference signal increases by, for example, ninety degrees, then the determined distance can be increased by, for example, nine millimeters based on the physical relationship between the frequency of the transmitted chirp, the frequency of the difference signal and the quantity of change of the phase. More specifically, for a range bin, such as the exemplary range bin 410, the difference signal can be determined to have a frequency 411, as illustrated by the amplitude/frequency graphs 440, 450, 460 and 470. Given a waveform having a frequency 411 a change in distance can be determined to correspond to a specific change in phase. This relationship between phase differences and changes in distance corresponding to such differences in phase can be predetermined and then, upon a detected difference in phase, the corresponding change in distance can be applied to the previously determined distance to generate an updated distance.

So long as the object 140 does not move too quickly, across too great a distance, changes in phase can be tracked and changes in distance can be updated accordingly. For example, the phase 471 can be the same as the phase 441, but the position of the object can be different between the two difference signals that result in such phases. Because the object 140, however, was tracked through the progression illustrated by the graphs 440, 450, 460 and 470, the phase 471 can be determined to be slightly different than the preceding phase 461, and the previously determined distance, based on the preceding phase 461, can be updated by a corresponding amount based on the subsequent phase 471. As such, the determined distance at the end of the progression will be different than that at the beginning, despite the phase 471 being the same as the phase 441. In a sense, the phase is being unwrapped by virtue of the continuous monitoring of the changes in the phase. More specifically, the cyclical nature of the phase, which repeatedly cycles from zero to two pi radians (or zero to three-hundred and sixty degrees) multiple times across a range bin, such as the exemplary range bin 410, prevents the determination of a fixed relationship between a specific phase value and a specific distance of the object 140. Instead, a determined distance is continually updated based on changes in distance corresponding to changes in phase. As a result, a phase cycling back around past two pi radians (or three-hundred and sixty degrees) does not result in a discontinuous change in distance determinations. For example, if the phase 461 was three hundred degrees, and the phase 471 was thirty degrees, the determination can be made that the phase 461 increased by ninety degrees, and, as a result, the previously determined distance should be increased by an amount commensurate with an increase in phase of ninety degrees. Thus, while the phase 441 can also have been thirty degrees, the determination of distance from the phase 471 can recognize that the phase 471 resulted from an addition of ninety degrees to the phase 461, as opposed to a subtraction of two-hundred and seventy degrees.

However, because of phase discontinuity between the range bin 410 and the range bin 420, the above described mechanisms cannot, on their own, continue to track an object beyond the range bin 410. For example, an object in the range bin 420 can generate a difference signal as represented by the amplitude/frequency graph 480, with a peak at a frequency 421, which can differ from the frequency 411 corresponding to the range bin 410. The phase of the phasor, however, bears no relationship to the phase of the phasors shown in the graphs 440, 450, 460 and 470.

Figure 5:
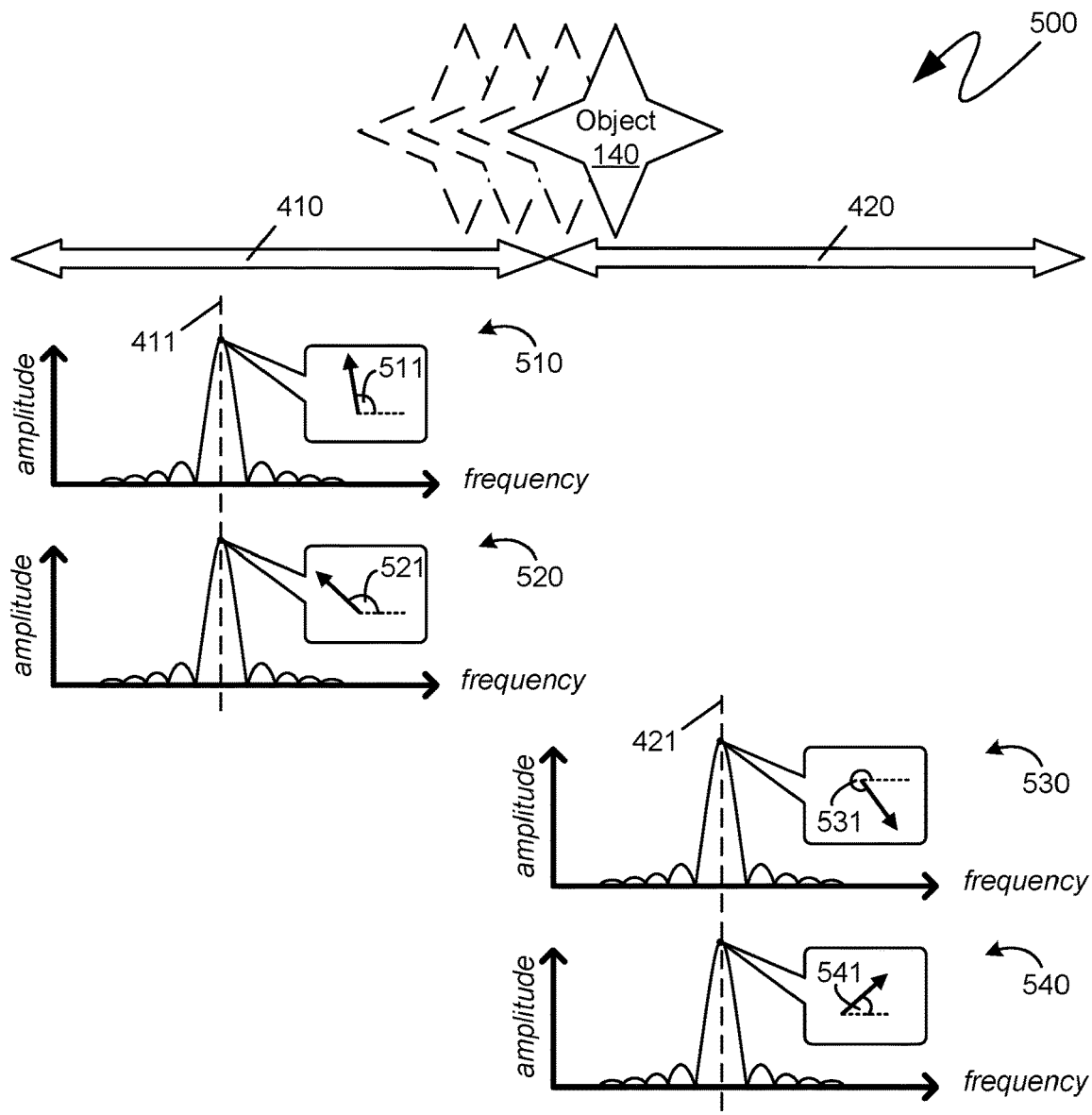
FIG. 5 a system diagram of an example of a discontinuity in phase across resolution ranges.

According to one aspect, an adjustment to the phase can be made as an object transitions from one range bin to another. Turning to FIG. 5, the exemplary diagram 500 shown therein illustrates an object, such as the exemplary object 140, changing its distance from the radar such that it moves from the range bin 410 to the range bin 420. While in the range bin 410, and approaching the border between the range bin 410 and the range bin 420, the difference between a transmitted chirp and its reflection from the object 140 can result in amplitude/frequency graphs such as the exemplary amplitude/frequency graphs 510 and 520. In accordance with the descriptions provided above, the exemplary amplitude/frequency graphs 510 and 520 can have peaks at a common frequency, namely the frequency 411, but the phasors corresponding thereto can have different phases, such as the exemplary phase 511 in the graph 510 and the exemplary phase 521 in the graph 520. In the example illustrated, the phase can be seen as increasing as the distance of the object 140 approaches the border between the range bin 410 and the range bin 420.

Subsequently, upon transitioning to the range bin 420, the distance of the object can result in differences between the transmitted chirp and the received bounce back which can be represented by the amplitude/frequency graphs 530 and 540. Again, in accordance with the descriptions provided above, the exemplary amplitude/frequency graphs 530 and 540 can have peaks at a common frequency, in this case the frequency 421, which can differ from the frequency 411. However, the phasors corresponding thereto can have different phases, such as the exemplary phase 531 in the graph 530 and the exemplary phase 541 in the graph 540. In the example illustrated, the phase can, again, be seen as increasing as the distance of the object 140 moves, in the range bin 420, away from the border between the range bin 410 and the range bin 420.

The exemplary graph 550 illustrates an exemplary transition of the distance of the object 140 from the range bin 410 to the range bin 420. More specifically, the phase is shown as increasing during the portion 561, corresponding to the phase within the range bin 410, such as was graphically illustrated by the phases 511 and 521, and the phase is also shown as increasing during the portion 562, corresponding to the phase within the range bin 420, such as was graphically illustrated by the phases 531 and 541. As expected, during the portion 562, as the phase reaches a maximum of two pi radians (or three-hundred and sixty degrees) it cycles back to zero and then continues increasing. Of note, however, is the discontinuity 560 at the time 551 at which the distance of the object 140 away from the radar transitioned between range bin 410 and the range bin 420.

According to one aspect, the quantity of the discontinuity 560 can be determined, and the phase within the destination range bin can be adjusted thereby so as to maintain continuity with the phase from the origin range bin, thereby allowing the previously described mechanisms for greater than range bin accuracy in object distance tracking. More specifically, and as detailed above a predetermination can have been made correlating a change in the distance of the object with a corresponding change in the phase of the phasor corresponding to the frequency of the difference signal. With each detected change in the phase, such as the detected change between the phase 511 and the phase 521, the determined distance between the radar in the object 140 can be accordingly adjusted. For example, if the phase 511 is one hundred degrees and the phase 521 is one hundred and thirty degrees, the phase difference can be determined to be thirty degrees. If it has been determined that each ten degree difference in phase results in a one millimeter difference in the distance between the object and the radar, then the distance of the object can be adjusted by three millimeters based on the determined difference in phase between the phase 511 and the phase 521 in the above example. In a similar manner, if the phase 531 is three hundred degrees and the phase 541 is thirty degrees, the phase difference can be determined to be ninety degrees. If it has been determined that each ten degree difference in phase results in a one millimeter difference in the distance between the object and the radar, then the distance of the object can be adjusted by nine millimeters based on the determined difference in phase between the phase 531 and the phase 541 in the above example.

To account for the discontinuity 560, the quantity of the discontinuity 560 can first be determined, and then, subsequently, the phase within the range bin 420, such as the phases 531 and 541 can be adjusted by the determined discontinuity. According to one aspect, to determine the quantity of the discontinuity 560, the phase of the last difference signal of the object in the prior range bin can be compared with the phase of the first difference signal of the object in the subsequent range bin. For example, within the exemplary system 500, the phase 521 can be compared with the phase 531. More specifically, since the distance of the object from the radar, as it transitions from the range bin 410 to the range bin 420, and, more specifically, right at the border, can be essentially the same, such that the phase 531, of the phase of the first difference signal of the object in the subsequent range bin, can be assumed to be essentially equal to the phase of the last difference signal of the object in the prior range bin, with any differences between the phases 521 and 531 being entirely attributable to the discontinuity 560. Thus, for example, according to one aspect, the discontinuity 560 is determined by determining the difference between the phase 521, of the last difference signal of the object in the prior range bin, and the phase 531 of the first difference signal of the object in the subsequent range bin.

According to another aspect, the discontinuity 560 can be determined from multiple data points. For example, during the transition of the object from the range bin 410 to the range bin 420, multiple chirps can be sent by the radar and returned by being reflected from the object 140. The difference signals between consecutive chirps and corresponding bounce backs can be Fourier transformed into the frequency domain and can result in multiple peaks, such as one peak at the frequency 411 and another peak at the frequency 421, or can result in multiple difference signals where some have a peak at the frequency 411 and others have a peak at the frequency 421. Such multiple difference signals provide multiple different phases of the phasors corresponding to the peaks at the frequencies 411 and 421, either individually, if there are multiple peaks, or in aggregate if each difference signal has only a single peak. The multiple data points, however, provide for a potentially more accurate determination of the discontinuity 560. For example, a difference between a phase of one phasor (of one difference signal based upon the object being within the range bin 410, and having a peak at the frequency 411), and the phase of another phasor (of another difference signal based upon the object being within the range bin 420, and having a peak at the frequency 421) can be determined. Such phase differences can then be determined between multiple phasors of multiple difference signals, with one of the difference signals based upon the object being within the range bin 410, and having a peak at the frequency 411 and the other of the difference signals being based upon the object being within the range bin 420, and having a peak at the frequency 421. An average of such multiple phase differences can then be generated. Other mechanisms for aggregating multiple such data points can likewise be utilized to determine the discontinuity 560.

Returning to the tracking of the distance of the object 140 the phase of the difference signal when the object is within the new range bin can then be adjusted by an amount equal to the determined discontinuity 560. For example, if the phase 521 is one hundred and thirty degrees and the phase 531 is three hundred degrees, the difference between them can be determined to be one hundred and seventy degrees, and the discontinuity 560 can be set to such a difference. Subsequently in determining changes in the distance of the object 140, phases of the difference signal when the object 140 is within the new range bin can then be adjusted by the determined discontinuity 560. Thus, for example, the phase 531 can be adjusted from three hundred degrees to one hundred and thirty degrees by subtracting the determine discontinuity of one hundred and seventy degrees. In a similar manner, the phase 541 can be adjusted, and so on. As a result, changes in the distance of the object 140 can be tracked with greater than range bin precision, even as the object moves between multiple range bins, by adjusting the phase as the object transitions between range bins, such as in the manner detailed.

Figure 6:
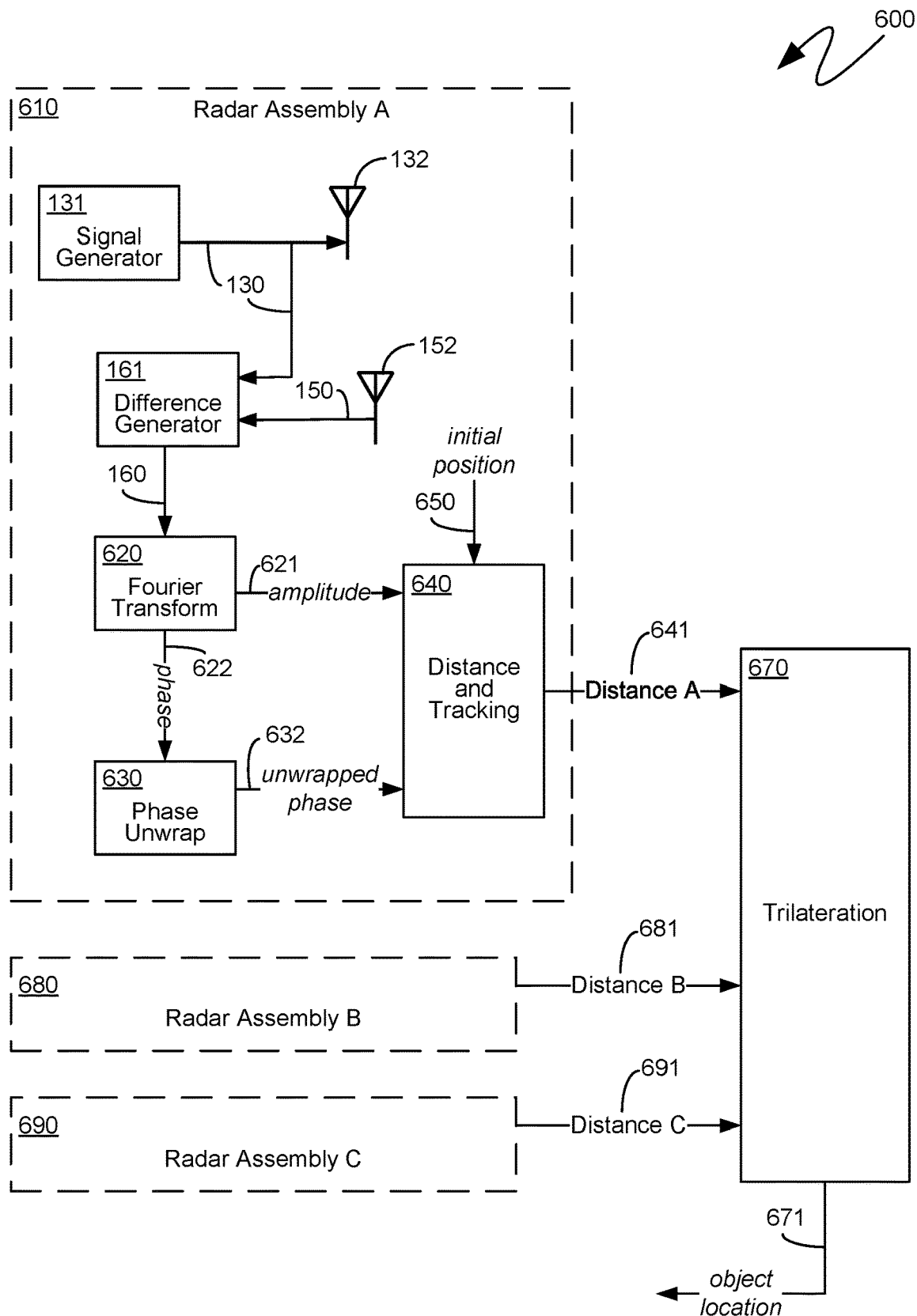
FIG. 6 is a system diagram of an example of a multi-radar system.

Turning to FIG. 6, an exemplary radar assembly is illustrated by the exemplary radar assembly 610. According to one aspect a radar assembly can comprise an antenna, which can function as a transmission antenna 132 and a receiving antenna 152, such as in the manner detailed above. Additionally, a radar assembly, such as the exemplary radar assembly 610, can comprise a signal generator, such as the exemplary signal generator 131, as well as a difference generator, such as the exemplary difference generator 161, both of which were also detailed above, such as with reference to FIG. 1. As indicated previously the difference signal 160 generated by the difference generator 161 can be either an analog signal, in which case it can be digitized, or it can already be a digital signal. The difference signal 160 can be provided to a Fourier transform, such as the exemplary Fourier transform 620, which can output a sequence, or stream, of digital data representing multiple phasors for each frequency representation of each difference signal, such as the exemplary difference signal 160. Each of the multiple phasor can comprise a phasor amplitude and a phasor phase, such as the exemplary amplitude 621 and the exemplary phase 622. The digital stream generated by the Fourier transform 620 can comprise digital data communicating the multiple phasors and each phasor's amplitude and phase. For ease of illustration, the amplitude 621 in the phase 622 are illustrated separately, though they would be encapsulated together within the digital data stream generated by the Fourier transform 620.

A phase unwrap, such as the exemplary phase unwrap 630, can track changes in the phase 622, such as by detecting changes between a phase of the phasor corresponding to the peak of the currently generated Fourier transform, of the current difference signal, and the phase of the phasor corresponding to the peak of the immediately previously generated Fourier transform, of the immediately prior difference signal. In such a manner, as detailed above, the phase can be tracked as it cycles multiple times through its zero to two pi radians (or three-hundred and sixty degrees) cycle. Such an unwrapped phase 632, together with the amplitude 621, and corresponding frequency, can be provided to a distance and tracking component, such as the exemplary distance and tracking component 640, which can generate a distance 641 of the object, such as in the manner detailed above. Although illustrated as separate elements, the phase unwrap 630 and the distance and tracking component 640 can be a single element, such as the execution of a single set of computer-executable instructions by a processing unit of a computing device. Analogously, the Fourier transform 620, and, indeed, the difference generator 621 and/or the signal generator 131 can also be part of the same computing device including being part of the computer executable instructions being executed by one or more processing units of such a computing device. Accordingly, the exemplary radar assembly 610 can be a single physical device having both computer processing functionality, such as to perform the above described functions, as well as physical components, such as the aforementioned one or more antenna. Alternatively, the exemplary radar assembly 610 can be multiple disparate devices including a radar device that can comprise the one or more antenna, as well as, optionally, other functionality, such as the signal generator 131 and/or the difference generator 161, and a computing device that can be separate and apart from the radar device that can execute computer executable instructions that perform the described functionality.

As indicated previously, an initial determination of the position of an object utilizing a transmitted chirp and a corresponding bounce back, such as in the manner detailed above, can only locate the object within a range bin, often leaving an unacceptably large area of uncertainty. While subsequent changes in the distance of the object can be tracked with greater than range bin precision, such as in the manner detailed above, the initial range of uncertainty remains. Accordingly, according to one aspect, an initial position of the object can be provided as input to the distance and tracking component 640, such as is illustrated by the exemplary initial position 650. The initial position 650 can be determined by any other mechanism for accurately determining the distance of an object including laser measurement, manual measurement, or any other like system, which are sometimes referred to as "ground truth" systems.

According to one aspect, the distance of an object determined from multiple disparate radar sources can be utilized to triangulate the object within three-dimensional space. Accordingly, the exemplary system 600 shown in FIG. 6 comprises three radar assemblies, including the above-described radar assembly 610 and additional radar assemblies 680 and 690 which can have at least to the transmission and reception antenna of such radar assemblies located in different locations from each other and from the radar assembly 610. The radar assemblies 680 and 690 can have their own computing functionality, either co-located therewith, or performed by separate, parallel computing devices, or the computing functionality can be provided by a single device utilized by two or more of the radar assemblies 610, 680 and 690. Each of the radar assemblies 610, 680 and 690 can separately determine the distance to the object utilizing the above described mechanisms. Accordingly, the radar assembly 610 can generate a distance 641, the radar assembly 680 can generate a distance 681, and the radar assembly 690 can generate a distance 691. The distances 641, 681 and 691 can be provided to a trilateration component such as the exemplary trilateration component 670, which can utilize three or more distances, determined from three or more points in three-dimensional space, to generate an object location in three-dimensional space, such as the exemplary object location 671. As utilized herein the term "trilateration" means of the determination of an area of intersection of three or more spherical areas, established with reference to a known point of origin and a known distance radius, in three-dimensional space.

Figure 7:
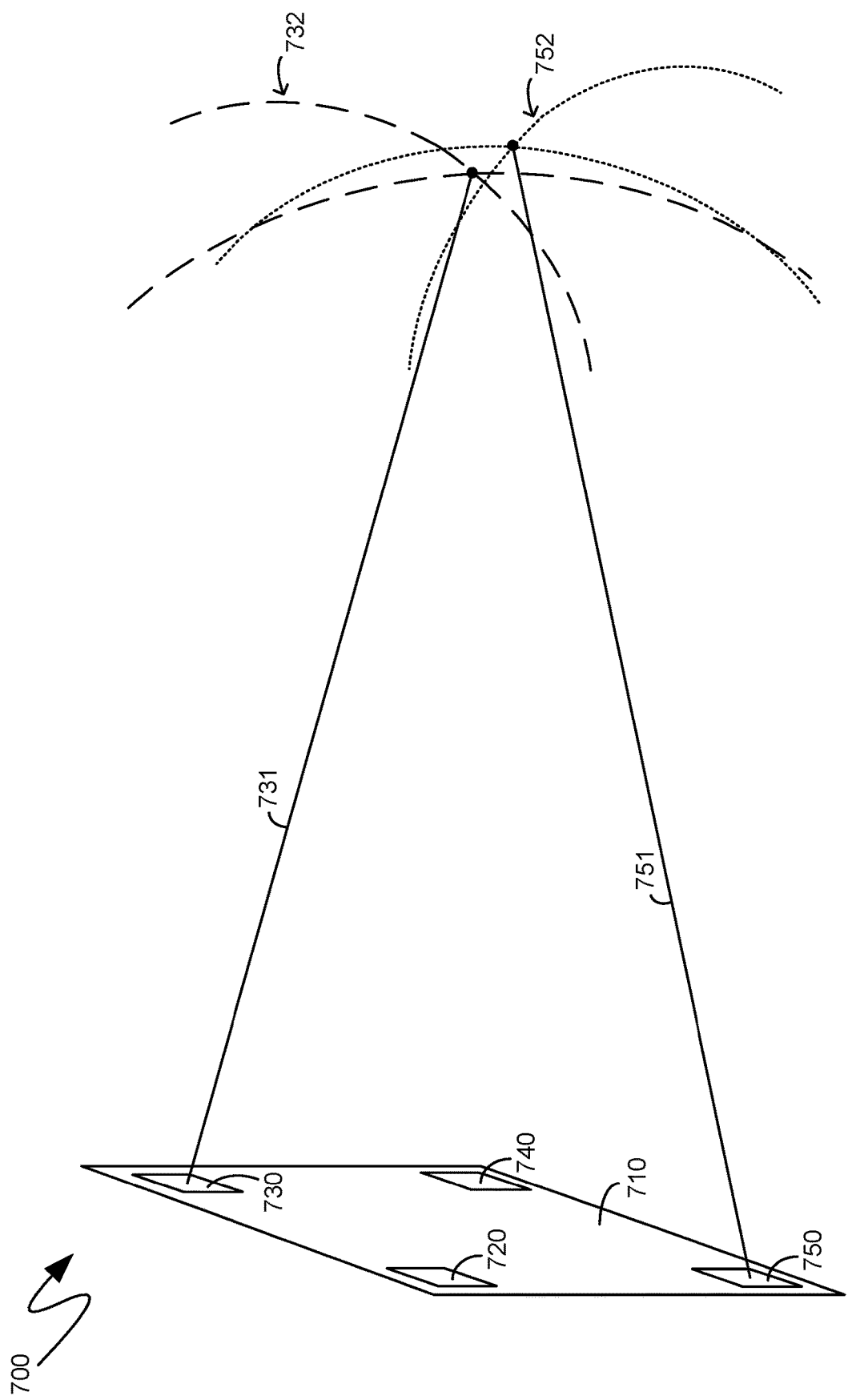
FIG. 7 a system diagram of an example of radar trilateration to locate an object in three-dimensional space.

Turning to FIG. 7, the exemplary system 700 shown therein shows an exemplary trilateration, such as can be performed by a radar system 710 that can comprise three or more radars, such as the exemplary radars 720, 730, 740 and 750. According to one aspect, the radar system 710 can be approximately one hundred by one hundred millimeters, or other like dimension that can enable the radar system 710 to be mounted on a head-mounted device, designed for being worn by a human user, and such as is commonly utilized in virtual reality and augmented reality applications.

Each of the exemplary radars 720, 730, 740 and 750 can generate chirps and detect the corresponding bounce back signals and, thereby, determine a distance to an object. For example, the exemplary radar 730 can determine a distance 731 to an object, while the exemplary radar 750 can determine the distance 751 to the same object. The distance of 731, as determined based on the signals sent by and received by the radar 730, can act as a radius and can define a semispherical area with its radius anchored at the location of the radar 730. A graphical representation of a portion of such a semispherical area is illustrated by the long-dashed lines 732. Analogously, the distance of 751, as determined based on the signals sent by and received by the radar 750, can also act as a radius and can also define a semispherical area with its radius anchored at the location of the radar 750. A graphical representation of a portion of such an area is illustrated by the short-dashed lines 752. Analogous semispherical areas can exist based on the distance is determined by the radars 720 and 740. The intersection of the semispherical areas can be a singular point in three-dimensional space, which can represent a location of the object in three-dimensional space. In some instances, the intersection of the semispherical areas can be an area where some, but not all, of the semispherical areas intersect. In such an instance such an intersection area can represent the location of the object in three-dimensional space with a range of uncertainty. For example, the object can be calculated to be within the center of the range of uncertainty, or other like averaging.

In some instances, one or more of the radars of the radar system 710 can result in determined distances to the object that generate semispherical areas that do not intersect with the intersection area of the semispherical areas generated from the distance determinations of the other radars. In such instances, the distance determinations of one or more of the radars of the radar system 710 can be ignored, and the position of the object in three-dimensional space can be trilaterated based on the determined distances from three or more radars with corresponding semispherical areas most closely, or most precisely, intersect.

Figure 8:
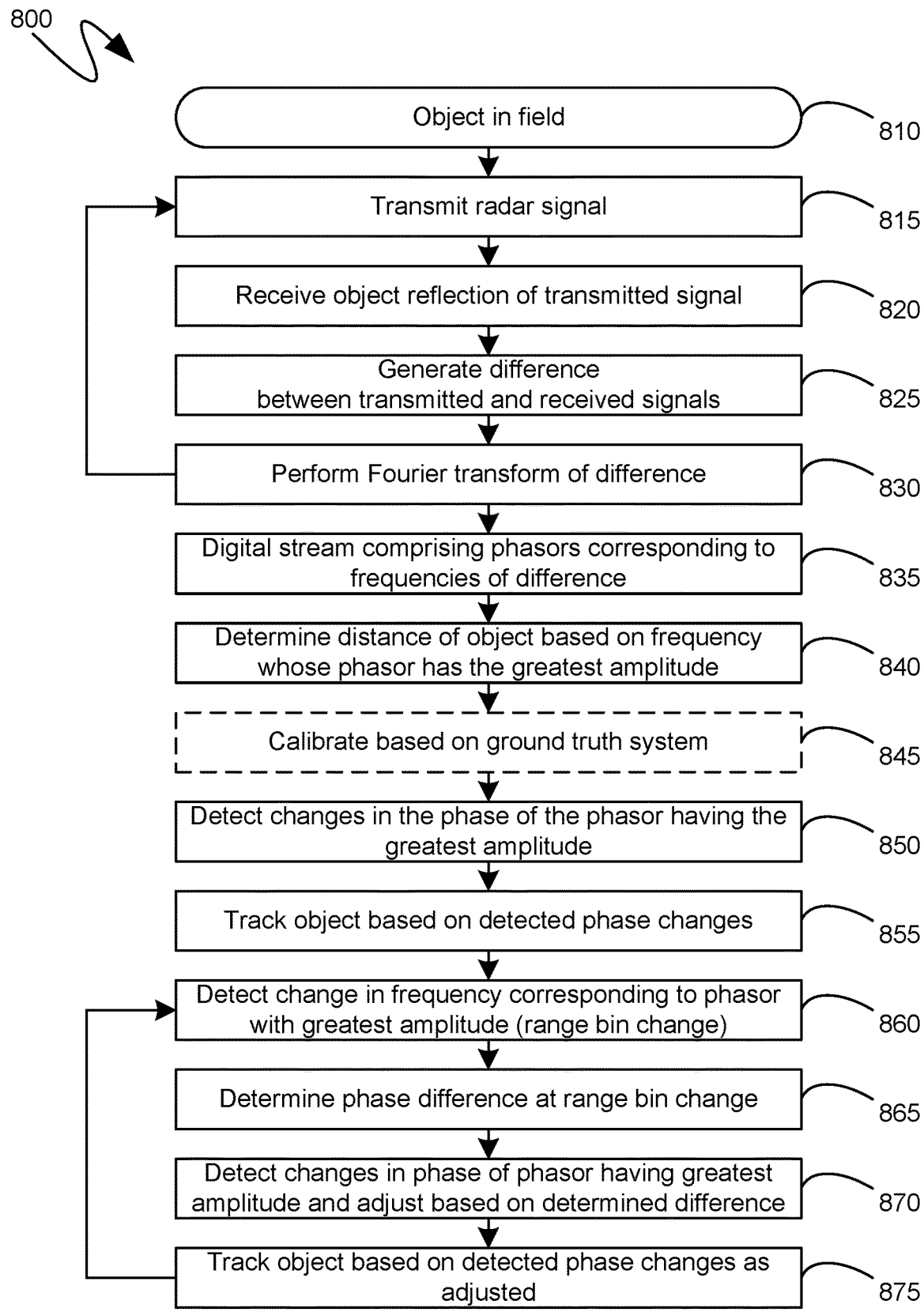
FIG. 8 is a flow diagram of an example of tracking an object with radar with greater than range resolution precision.

Turning to FIG. 8 an exemplary flow diagram for tracking a distance of an object with greater than range bin precision is illustrated by the exemplary flow diagram 800 shown therein. Initially, at step 810, an object can be positioned in a field of view of a radar. At step 815, the radar can transmit a signal which, as described previously, can be a "chirp", as that term has been defined and utilized herein. The transmitted chirp can be reflected by the object and the radar can receive the object's reflection thereof at step 820. At step 825 the difference between the transmitted and received signals can be generated, and, at step 830, a Fourier transform of the difference can be generated, thereby representing the difference signal in the frequency domain. As detailed above the output of the Fourier transform can be a stream of digital data comprising phasors corresponding to different frequencies, with each phasor having an amplitude and a phase. At step 840, the range bin of an object, acting as a rough distance to the object, can be determined from the peak of the Fourier transform generated at step 830. More specifically, at step 840, the distance of the object is based on the frequency corresponding to the phasor having the greatest amplitude, from among the phasors that represent the Fourier transform of step 830, received in the form of the digital stream of step 835. Optionally, at step 845 a more precise location of the object, to remove an initial uncertainty, can enable distance calibration at step 845.

As indicated in the flow diagram 800, the performance of steps 815, 820, 825 and 830 can be repeated periodically with each subsequent difference signal indicating a change in the distance of the object. More specifically, as illustrated by step 850, each subsequent difference signal can have a difference in the phase of the phasor having the greatest amplitude. At step 855 the distance to the object can be tracked with greater than range bin precision by reference to the changes in the phase detected at step 850, such as in the manner detailed previously.

At step 860, a change in the range bin of an object's distance can be detected based on a change in the frequency which corresponds to the phasor having the largest amplitude. In such an instance, at step 865 the discontinuity in the phase at the range bin change can be determined, such as in the manner detailed above. At 870, the phase of the phasor having the largest amplitude can be adjusted based on the discontinuity determined at step 865. The object's distance can then be tracked, again with greater than range bin precision, based on changes in the adjusted phase. The steps of 860, 865, 870 and 875 can then be repeated for other range bin changes of the object's distance as the object moves around in three-dimensional space.

Figure 9:
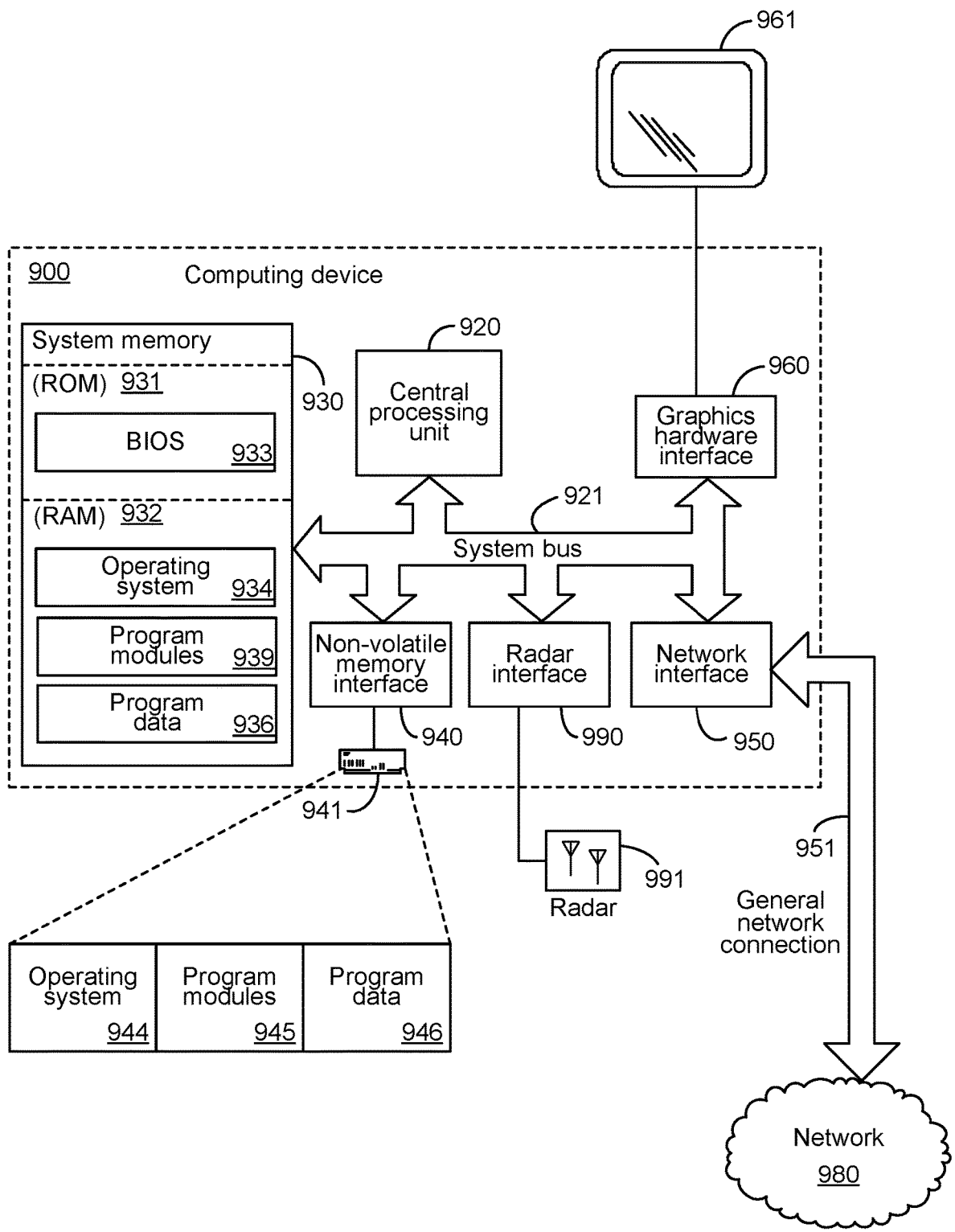
FIG. 9 is a block diagram of an example of a computing device.

Turning to FIG. 9, an exemplary computing device 900 is illustrated which can perform some or all of the mechanisms and actions described above. The exemplary computing device 900 can include, but is not limited to, one or more hardware processing units, such as central processing units (CPUs) 920, graphics processing units and other like hardware processing units, which are sometimes colloquially referred to as "chips". The computing device 900 can further include a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. The computing device 900 can optionally include graphics hardware, including, but not limited to, a graphics hardware interface 960 and a display device 961, which can include display devices capable of receiving touch-based user input, such as a touch-sensitive, or multi-touch capable, display device. Additionally, the computing device 900 can optionally include a radar interface, such as the exemplary radar interface 990 that can be communicationally coupled to the system bus 921 and can support standardized peripheral and/or extension communication protocols to allow additional hardware devices, such as radar devices, to be communicationally coupled with the computing device 900. By way of example, the exemplary radar 991 can be communicationally coupled to the system bus 921 via the radar interface 990. The exemplary radar 991 can be part of the physical housing of the computing device 900, such that the radar 991 and the computing device 900 are co-located within a single physical housing. Alternatively, the exemplary radar 991 can be separate peripheral hardware devices that are communicationally coupled to the exemplary computing device 900. While illustrated as being communicationally coupled to the computing device 900 through the radar interface 990, the exemplary radar 991 can be communicationally coupled to the system bus 921 via the network 980 and the general network connection 951 thereto provided by the network interface 950, as detailed below. Depending on the specific physical implementation, one or more of the CPUs 920, the system memory 930 and other components of the computing device 900 can be physically co-located, such as on a single chip. In such a case, some or all of the system bus 921 can be nothing more than silicon pathways within a single chip structure and its illustration in FIG. 9 can be nothing more than notational convenience for the purpose of illustration.

The computing device 900 also typically includes computer readable media, which can include any available media that can be accessed by computing device 900 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 900. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer content between elements within computing device 900, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, other program modules 935, and program data 936.

The computing device 900 may also include other removable/non-removable, volatile/nonvolatile computer storage media. By way of example only, FIG. 9 illustrates a hard disk drive 941 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 941 is typically connected to the system bus 921 through a nonvolatile memory interface such as interface 940.

The drives and their associated computer storage media discussed above and illustrated in FIG. 9, provide storage of computer readable instructions, data structures, program modules and other data for the computing device 900. In FIG. 9, for example, hard disk drive 941 is illustrated as storing operating system 944, other program modules 945, and program data 946. Note that these components can either be the same as or different from operating system 934, other program modules 935 and program data 936. Operating system 944, other program modules 945 and program data 946 are given different numbers hereto illustrate that, at a minimum, they are different copies.

The computing device 900 may operate in a networked environment using logical connections to one or more remote computers. The computing device 900 is illustrated as being connected to the general network connection 951 (to the network 980) through a network interface or adapter 950, which is, in turn, connected to the system bus 921. In a networked environment, program modules depicted relative to the computing device 900, or portions or peripherals thereof, may be stored in the memory of one or more other computing devices or stand-alone peripheral computing devices that are communicatively coupled to the computing device 900 through the general network connection 951. It will be appreciated that the network connections shown are exemplary and other means of establishing a communications link between computing devices may be used.

Although described as a single physical device, the exemplary computing device 900 can be a virtual computing device, in which case the functionality of the above-described physical components, such as the CPU 920, the system memory 930, the network interface 940, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 900 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a method of using radar to track a distance of an object with greater precision than a resolution of the radar, the method comprising: receiving a stream of digital data comprising multiple phasors, each phasor corresponding to a frequency, each phasor comprising an amplitude and a phase, the multiple phasors being frequency domain representations of a difference between a transmitted radar signal and a received radar signal, the received radar signal being the transmitted radar signal as reflected by the object; determining, from a first portion of the stream, the distance of the object based on a first frequency at which the amplitude of a phasor corresponding to the first frequency is greater than the amplitude of other phasors corresponding to other frequencies during the first portion of the stream; tracking the object by determining changes in the distance of the object based on corresponding changes, during a second portion of the stream, in the phase of the phasor corresponding to the first frequency, the second portion of the stream being consecutively after the first portion of the stream; identifying a range change during a third portion of the stream by detecting that the amplitude of a phasor corresponding to a second frequency has become greater than the amplitude of the phasor corresponding to the first frequency during the third portion of the stream, the third portion of the stream being consecutively after the second portion of the stream; determining, in response to the identified range change, a phase difference, during the third portion of the stream, between the phase of the phasor corresponding to the first frequency and the phase of the phasor corresponding to the second frequency; generating an adjusted phase of the phasor corresponding to the second frequency based on the determined phase difference; and continuing to track the object by determining changes in the distance of the object based on corresponding changes, during a fourth portion of the stream, in the adjusted phase of the phasor corresponding to the second frequency, the fourth portion of the stream being consecutively after the third portion of the stream.

A second example is the method of the first example, wherein the first portion of the stream comprises digital data of a digital Fourier transform of a difference between a transmitted first radar chirp and a received first radar signal, the received first radar signal being the first radar chirp as reflected by the object.

A third example is the method of the second example, wherein the second portion of the stream comprises digital data of multiple digital Fourier transforms of differences between multiple ones of transmitted additional radar chirps and multiple ones of corresponding received radar signals, the multiples ones of corresponding received radar signals being the transmitted additional radar chirps as consecutively reflected by the object.

A fourth example is the method of the first example, wherein the tracking the object comprises: updating the determined distance of the object by a predetermined length per angular change in the phase of the phasor corresponding to the first frequency.

A fifth example is method of the fourth example, wherein the predetermined length is based on the first frequency.

A sixth example is the method of the first example, wherein the third portion of the stream comprises digital data of multiple digital Fourier transforms of differences between multiple ones of transmitted additional radar chirps and multiple ones of corresponding received radar signals, the multiples ones of corresponding received radar signals being the transmitted additional radar chirps as consecutively reflected by the object.

A seventh example is the method of the sixth example, wherein the determining the phase difference during the third portion of the stream comprises determining multiple phase differences between the phase of the phasor corresponding to the first frequency and the phase of the phasor corresponding to the second frequency at each of the multiple digital Fourier transforms.

An eighth example is the method of the first example, further comprising: receiving an input of a calibration distance; wherein the determining the distance of the object based on the first frequency comprises setting the distance of the object to be the input calibration distance when the input calibration distance is within a range of distances that correspond to the first frequency.

A ninth example is the method of the first example, further comprising: receiving multiple distances of the object as determined by performing the method of claim 1 utilizing multiple different radars; and determining a location of the object in three-dimensional space based on an intersection in three-dimensional space of at least some of the received distances of the object as measured from locations, in three-dimensional space, of the multiple different radars.

A tenth example is the method of the ninth example, wherein the determining the location of the object in three-dimensional space comprises disregarding a first one of the received multiple distances based on the first one of the received multiple distances differing more than a threshold amount from the intersection.

An eleventh example is a radar system for tracking a distance of an object with greater precision than a resolution of individual radars, the system comprising: a first one of the individual radars, the first radar comprising a first radar transmitter and a first radar receiver; and a first computing device comprising a first processing unit and a first computer-readable storage media, the first computer-readable storage media storing computer-executable instructions, which, when executed by the first processing unit, cause the first computing device to determine and update a first distance of the object based on radar signals from the first radar; wherein a determining and updating of a distance of the object based on radar signals comprises: determining the distance of the object based on a first frequency at which an amplitude of a phasor corresponding to the first frequency is greater than an amplitude of other phasors corresponding to other frequencies of a frequency domain representation of a difference between a transmitted radar signal and a received radar signal, the received radar signal being the transmitted radar signal as reflected by the object; tracking the object by changing the distance based on corresponding changes in a phase of the phasor corresponding to the first frequency during subsequent frequency domain representations of subsequent differences between subsequent transmitted radar signals and corresponding subsequent received radar signals, the corresponding received radar signals being the transmitted radar signals as reflected by the object; identifying a range change by detecting that the amplitude of a phasor corresponding to a second frequency has become greater than the amplitude of the phasor corresponding to the first frequency during further subsequent frequency domain representations of further subsequent differences between further subsequent transmitted radar signals and corresponding further subsequent received radar signals, the corresponding received radar signals being the transmitted radar signals as reflected by the object; generating an adjusted phase of the phasor corresponding to the second frequency based on the determined phase difference; and continue to track the object by changing the distance based on corresponding changes in the adjusted phase of the phasor corresponding to the second frequency during still further subsequent frequency domain representations of still further subsequent differences between still further subsequent transmitted radar signals and corresponding still further subsequent received radar signals, the corresponding received radar signals being the transmitted radar signals as reflected by the object.

A twelfth example is the radar system of the eleventh example, further comprising: a second one of the individual radars, the second radar comprising a second radar transmitter and a second radar receiver, the radar system determining and updating a second distance of the object based on radar signals from the second radar; and a third one of the individual radars, the third radar comprising a third radar transmitter and a third radar receiver, the radar system determining and updating a third distance of the object based on radar signals from the third radar.

A thirteenth example is the radar system of the twelfth example, wherein the first computer-readable storage media stores further computer-executable instructions, which, when executed by the first processing unit, cause the first computing device to perform at least one of: the determining and updating of the second distance of the object based on radar signals from the second radar or the determining and updating of the third distance of the object based on radar signals from the third radar.

A fourteenth example the radar system of the twelfth example, further comprising: a second computing device comprising a second processing unit and a second computer-readable storage media, the second computer-readable storage media storing computer-executable instructions, which, when executed by the second processing unit, cause the second computing device to perform at least one of: the determining and updating of the second distance of the object based on radar signals from the second radar or the determining and updating of the third distance of the object based on radar signals from the third radar; wherein the first computing device is co-located with the first radar; and wherein the second computing device is co-located with at least one of: the second radar or the third radar.

A fifteenth example the radar system of the twelfth example, wherein the first computer-readable storage media stores further computer-executable instructions, which, when executed by the first processing unit, cause the first computing device to: determine a location of the object in three-dimensional space based on an intersection in three-dimensional space of: (1) the first distance, as measured from the first radar, (2) the second distance, as measured from the first radar, and (3) the third distance, as measured from the third radar.

A sixteenth example is the radar system of the fifteenth example, further comprising: a fourth one of the individual radars, the fourth radar comprising a fourth radar transmitter and a fourth radar receiver, the radar system determining and updating a fourth distance of the object based on radar signals from the fourth radar; wherein the determining the location of the object in three-dimensional space comprises excluding the fourth distance from the determining the location of the object in three-dimensional space based on the fourth distance, as measured from the fourth radar, being greater than a threshold distance away from the intersection.

A seventeenth example is computing device comprising: one or more processing units; and one or more computer-readable storage media storing computer-executable instructions, which, when executed by at least some of the one or more processing units, cause the computing device to perform steps comprising: receiving a frequency domain representation of a first signal, wherein a frequency domain representation of a signal comprises multiple phasors, each phasor corresponding to a frequency of which the signal is comprised, each phasor comprising an amplitude and a phase; determining a distance of an object based on a first frequency at which the amplitude of a phasor corresponding to the first frequency, from among the multiple phasors of the frequency domain representation of the first signal, is greater than the amplitude of others of the multiple phasors of the frequency domain representation of the first signal; receiving a frequency domain representation of a second signal; tracking the object by determining a change in the distance of the object based on a change, between the frequency domain representation of the first signal and the frequency domain representation of the second signal, in the phase of the phasor corresponding to the first frequency; receiving a frequency domain representation of a third signal; identifying a range change by detecting that the amplitude of a phasor corresponding to a second frequency, from among multiple phasors of the frequency domain representation of the third signal, has become greater than the amplitude of the phasor corresponding to the first frequency from among the multiple phasors of the frequency domain representation of the third signal; determining, in response to the identified range change, a phase difference between the phase of the phasor corresponding to the first frequency and the phase of the phasor corresponding to the second frequency; generating an adjusted phase of the phasor corresponding to the second frequency based on the determined phase difference; receiving a frequency domain representation of a fourth signal; and continuing to track the object by determining a change in the distance of the object based on a change, between the frequency domain representation of the third signal and the frequency domain representation of the fourth signal, in the adjusted phase of the phasor corresponding to the second frequency.

An eighteenth example is the computing device of the seventeenth example, wherein: the first signal is a difference between a transmitted first radar chirp and a received first radar signal, the received first radar signal being the first radar chirp as reflected by the object; the second signal is a difference between a transmitted second radar chirp and a received second radar signal, the received second radar signal being the second radar chirp as reflected by the object; the third signal is a difference between a transmitted third radar chirp and a received third radar signal, the received third radar signal being the third radar chirp as reflected by the object; the fourth signal is a difference between a transmitted fourth radar chirp and a received fourth radar signal, the received fourth radar signal being the fourth radar chirp as reflected by the object; the first radar chirp preceding the second radar chirp; the second radar chirp preceding the third radar chirp; and the third radar chirp preceding the fourth radar chirp.

A nineteenth example is the computing device of the seventeenth example, wherein the tracking the object comprises: determining the change in the distance of the object to be by a predetermined length per angular change in the phase of the phasor corresponding to the first frequency.

A twentieth example is the computing device of the seventeenth example, wherein the determining the distance of the object based on the first frequency comprises setting the distance of the object to be an input calibration distance when the input calibration distance is within a range of distances that correspond to the first frequency.

As can be seen from the above descriptions, mechanisms for tracking an object with radar with greater than range resolution precision have been presented. In view of the many possible variations of the subject matter described herein, we claim as our invention all such embodiments as may come within the scope of the following claims and equivalents thereto.

We claim:

1. A method of using radar to track a distance of an object with greater precision than a range resolution of the radar, the method comprising:
receiving a sequence of digital data comprising multiple phasors, each phasor corresponding to a respective frequency, each phasor having an amplitude and a phase, the multiple phasors being frequency domain representations of a difference between a transmitted radar signal and a received radar signal, the received radar signal being the transmitted radar signal as reflected by the object;
determining an initial distance of the object in a first range bin based on a first frequency at which the amplitude of a first phasor corresponding to the first frequency is greater than the amplitudes of other phasors corresponding to other frequencies;

tracking the object by determining changes from the initial distance of the object in the first range bin based on corresponding changes in the phase of the first phasor;

identifying a range change as the object moves from the first range bin to a second range bin by detecting that the amplitude of a second phasor corresponding to a second frequency has become greater than the amplitude of the first phasor;

determining, in response to the identified range change, a quantity of a phase discontinuity that is a phase difference between a last phase of the first phasor and a first phase of the second phasor;

generating an adjusted first phase of the second phasor to maintain phase continuity between the last phase of the first phasor in the first range bin and the first phase of the second phasor in the second range bin; and continuing to track the object by determining changes in the distance of the object in the second range bin based on corresponding changes in the adjusted first phase of the second phasor.

2. The method of claim 1, wherein a first portion of the sequence of digital data from which the initial distance of the object is determined comprises digital data of a digital Fourier transform of a difference between a transmitted first radar chirp and a received first radar signal, the received first radar signal being the first radar chirp as reflected by the object.

3. The method of claim 2, wherein a second portion of the sequence of digital data from which changes from the initial distance are determined comprises digital data of multiple digital Fourier transforms of differences between multiple ones of transmitted additional radar chirps and multiple ones of corresponding received radar signals, the multiples ones of corresponding received radar signals being the transmitted additional radar chirps as consecutively reflected by the object.

4. The method of claim 1, wherein tracking the object comprises:

updating the determined initial distance of the object by a predetermined length per angular change in the phase of the first phasor.

5. The method of claim 4, wherein the predetermined length is based on the first frequency.

6. The method of claim 1, wherein a third portion of the sequence of digital data from which the quantity of the phase discontinuity is determined comprises digital data of multiple digital Fourier transforms of differences between multiple ones of transmitted additional radar chirps and multiple ones of corresponding received radar signals, the multiples ones of corresponding received radar signals being the transmitted additional radar chirps as consecutively reflected by the object.

7. The method of claim 6, wherein determining the phase difference during the third portion of the sequence comprises determining multiple phase differences between the phase of the first phasor and the phase of the second phasor at each of the multiple digital Fourier transforms.

8. The method of claim 1, further comprising:
receiving an input of a calibration distance, wherein
determining the initial distance of the object in the first range bin based on the first frequency comprises setting the initial distance of the object to be the input calibration distance when the input calibration distance is within a range of distances that correspond to the first frequency.

9. The method of claim 1, further comprising:
receiving multiple distances of the object as determined by performing the method of claim 1 utilizing multiple different radars; and
determining a location of the object in three-dimensional space based on an intersection in three-dimensional space of at least some of the received distances of the object as measured from locations, in three-dimensional space, of the multiple different radars.

10. The method of claim 9, wherein determining the location of the object in three-dimensional space comprises disregarding a first one of the received multiple distances based on the first one of the received multiple distances differing more than a threshold amount from the intersection.

11. A radar system for tracking a distance of an object with greater precision than a range resolution of a plurality of individual radars, the system comprising:

a first radar comprising a first radar transmitter and a first radar receiver; and a first computing device comprising a first processing unit and a first computer-readable storage media, the first computer-readable storage media storing computer-executable instructions, which, when executed by the first processing unit, cause the first computing device to determine and update a first distance of the object based on radar signals from the first radar;

wherein a determining and updating of a distance of the object based on radar signals comprises:

determining an initial distance of the object in a first range bin based on a first frequency at which an amplitude of a first phasor corresponding to the first frequency is greater than amplitudes of other phasors corresponding to other frequencies of a frequency domain representation of a difference between a transmitted radar signal and a received radar signal, the received radar signal being the transmitted radar signal as reflected by the object;

tracking the object by changing the initial distance of the object in the first range bin based on corresponding changes in a phase of the first phasor corresponding to the first frequency during subsequent frequency domain representations of subsequent differences between subsequent transmitted radar signals and corresponding subsequent received radar signals;

identifying a range change as the object moves from the first range bin to a second range bin by detecting that the amplitude of a second phasor corresponding to a second frequency has become greater than the amplitude of the first phasor during further subsequent frequency domain representations of further subsequent differences between further subsequent transmitted radar signals and corresponding further subsequent received radar signals;

determining, in response to the identified range change, a quantity of a phase discontinuity that is a phase difference between a last phase of the first phasor and a first phase of the second phasor;

generating an adjusted first phase of the second phasor to maintain phase continuity between the last phase of the first phasor in the first range bin and the first phase of the second phasor in the second range bin; and continuing to track the object by changing the distance of the object in the second range bin based on corresponding changes in the adjusted first phase of the second phasor during still further subsequent frequency domain representations of still further subsequent differences between still further subsequent transmitted radar signals and corresponding still further subsequent received radar signals.

12. The radar system of claim 11, further comprising:
a second radar comprising a second radar transmitter and a second radar receiver, the radar system being configured to determined and update a second distance of the object based on radar signals from the second radar; and
a third radar comprising a third radar transmitter and a third radar receiver, the radar system being configured to determined and update a third distance of the object based on radar signals from the third radar.

13. The radar system of claim 12, wherein the first computer-readable storage media stores further computer-executable instructions, which, when executed by the first processing unit, cause the first computing device to perform at least one of: determining and updating the second distance of the object based on radar signals from the second radar and determining and updating the third distance of the object based on radar signals from the third radar.

14. The radar system of claim 12, further comprising:
a second computing device comprising a second processing unit and a second computer-readable storage media, the second computer-readable storage media storing computer-executable instructions, which, when executed by the second processing unit, cause the second computing device to perform at least one of: determining and updating the second distance of the object based on radar signals from the second radar and determining and updating the third distance of the object based on radar signals from the third radar;
wherein the first computing device is co-located with the first radar; and
wherein the second computing device is co-located with at least one of: the second radar and the third radar.

15. The radar system of claim 12, wherein the first computer-readable storage media stores further computer-executable instructions, which, when executed by the first processing unit, cause the first computing device to:
determine a location of the object in three-dimensional space based on an intersection in three-dimensional space of: (1) the first distance, as measured from the first radar, (2) the second distance, as measured from the first radar, and (3) the third distance, as measured from the third radar.

16. The radar system of claim 15, further comprising:
a fourth radar comprising a fourth radar transmitter and a fourth radar receiver, the radar system being configured to determined and update a fourth distance of the object based on radar signals from the fourth radar;
wherein determining the location of the object in three-dimensional space comprises excluding the fourth distance when fourth distance, as measured from the fourth radar, is determined to be greater than a threshold distance away from the intersection of the first distance, the second distance, and the third distance.

17. A computing device comprising:
one or more processing units; and
one or more computer-readable storage media storing computer-executable instructions, which, when executed by at least some of the one or more processing units, cause the computing device to perform steps comprising:
receiving a frequency domain representation of a first signal, wherein a frequency domain representation of a signal comprises multiple phasors, each phasor corresponding to a respective frequency of which the signal is comprised, each phasor having an amplitude and a phase;
determining an initial distance of an object in a first range bin based on a first frequency at which the amplitude of a first phasor corresponding to the first frequency, from among the multiple phasors of the frequency domain representation of the first signal, is greater than the amplitudes of remaining phasors of the frequency domain representation of the first signal;
receiving a frequency domain representation of a second signal;
tracking the object by determining a change from the initial distance of the object in the first range bin based on a change, between the frequency domain representation of the first signal and the frequency domain representation of the second signal, in the phase of the first phasor;
receiving a frequency domain representation of a third signal;
identifying a range change as the object moves from the first range bin to a second range bin by detecting that the amplitude of a second phasor corresponding to a second frequency, from among multiple phasors of the frequency domain representation of the third signal, has become greater than the amplitude of the first phasor;
determining, in response to the identified range change, a quantity of a phase discontinuity that is a phase difference between a last phase of the first phasor and a first phase of the second phasor;
generating an adjusted first phase of the second phasor to maintain phase continuity between the last phase of the first phasor in the first range bin and the first phase of the second phasor in the second range bin;
receiving a frequency domain representation of a fourth signal; and
continuing to track the object by determining a change in the distance of the object in the second range bin based on a change, between the frequency domain representation of the third signal and the frequency domain representation of the fourth signal, in the adjusted first phase of the second phasor.

18. The computing device of claim 17, wherein:
the first signal is a difference between a transmitted first radar chirp and a received first radar signal, the received first radar signal being the first radar chirp as reflected by the object, the first radar chirp preceding the second radar chirp;
the second signal is a difference between a transmitted second radar chirp and a received second radar signal, the received second radar signal being the second radar chirp as reflected by the object, the second radar chirp preceding the third radar chirp;
the third signal is a difference between a transmitted third radar chirp and a received third radar signal, the received third radar signal being the third radar chirp as reflected by the object, the third radar chirp preceding the fourth radar chirp; and
the fourth signal is a difference between a transmitted fourth radar chirp and a received fourth radar signal, the received fourth radar signal being the fourth radar chirp as reflected by the object.

19. The computing device of claim 17, wherein tracking the object comprises:

updating the determined initial distance of the object by a predetermined length per angular change in the phase of the first phasor.

20. The computing device of claim 17, wherein determining the distance of the object in the first range bin based on the first frequency comprises setting the initial distance of the object to be an input calibration distance when the input calibration distance is within a range of distances that correspond to the first frequency.

* * * * *